United States Patent [19]

Seazholtz et al.

[11] Patent Number: 5,594,789
[45] Date of Patent: Jan. 14, 1997

[54] TRANSACTION IMPLEMENTATION IN VIDEO DIAL TONE NETWORK

[75] Inventors: John W. Seazholtz, Great Falls, Va.; Alex McAllister, Wheaton, Md.

[73] Assignee: Bell Atlantic Network Services, Inc., Arlington, Va.

[21] Appl. No.: 322,124

[22] Filed: Oct. 13, 1994

[51] Int. Cl.⁶ .............................. H04M 3/42; H04N 7/173
[52] U.S. Cl. .............................. 379/207; 379/88; 379/96; 348/8; 348/13; 348/552; 395/279
[58] Field of Search ...................... 379/207, 201, 379/229, 89, 88, 67, 90, 93, 96, 102; 348/7, 10, 13, 14, 552, 734; 395/2.84, 2.79

[56] References Cited

U.S. PATENT DOCUMENTS

| | | | |
|---|---|---|---|
| 4,356,509 | 10/1982 | Skerlos et al. | 358/85 |
| 4,506,387 | 3/1985 | Walter | 359/118 |
| 4,706,121 | 11/1987 | Young | 348/27 |
| 4,745,468 | 5/1988 | Von Kohorn | 348/13 |
| 4,763,191 | 8/1988 | Gordon et al. | 348/7 |
| 4,876,592 | 10/1989 | Von Kohorn | 348/13 |
| 4,905,094 | 2/1990 | Pocock et al. | 358/342 |
| 4,926,255 | 5/1990 | Von Kohorn | 348/13 |
| 4,947,028 | 8/1990 | Gorog | 235/381 |
| 4,949,187 | 8/1990 | Cohen | 358/335 |
| 4,963,995 | 10/1990 | Lang | 358/335 |
| 4,977,455 | 12/1990 | Young | 348/460 |
| 5,027,400 | 6/1991 | Baji et al. | 380/20 |
| 5,034,807 | 7/1991 | Von Kohorn | 348/13 |
| 5,051,822 | 9/1991 | Rhoades | 348/3 |
| 5,057,915 | 10/1991 | Von Kohorn | 348/13 |
| 5,057,932 | 10/1991 | Lang | 358/335 |
| 5,093,718 | 3/1992 | Hoarty et al. | 358/84 |
| 5,119,188 | 6/1992 | McColley et al. | 358/86 |
| 5,128,752 | 7/1992 | Von Kohorn | 348/3 |
| 5,130,792 | 7/1992 | Tindell et al. | 348/7 |
| 5,132,992 | 7/1992 | Yurt et al. | 375/240 |
| 5,133,079 | 7/1992 | Ballantyne et al. | 455/4.1 |
| 5,151,789 | 9/1992 | Young | 348/734 |
| 5,220,420 | 6/1993 | Hoarty et al. | 358/86 |
| 5,227,874 | 7/1993 | Von Kohorn | 348/2 |
| 5,241,588 | 8/1993 | Babson, III et al. | 379/201 |
| 5,247,347 | 9/1993 | Litteral et al. | 348/7 |
| 5,247,571 | 9/1993 | Kay et al. | 379/207 |
| 5,249,044 | 9/1993 | Von Kohorn | 348/12 |
| 5,253,275 | 10/1993 | Yurt et al. | 375/240 |
| 5,278,889 | 1/1994 | Papanicolaou et al. | 348/14 |
| 5,329,589 | 7/1994 | Fraser et al. | 379/91 |

(List continued on next page.)

OTHER PUBLICATIONS

"Evolvobility of the Advanced Intelligent Network", R. K. Berman et al. IEEE/ICC 1991 pp. 21.1.1–21.1.5.
"Intelligent Networks: New technology, New Opportunities", Goldberg, Electronic Design; Aug. 8, 1994 pp. 73–74, 81–82, 84.

Primary Examiner—Krista M. Zele
Assistant Examiner—Scott L. Weaver
Attorney, Agent, or Firm—Lowe, Price, Leblanc & Becker

[57] ABSTRACT

Disclosed is a system and method of implementing purchasing and other transactions in an integrated multimedia communication system by utilizing an intelligent peripheral of an advanced intelligent telephone network which peripheral includes a voice recognition module for providing control capability based on received voice signals, and a voice verification module which includes a storage database for individualized voice authentication templates. The processor also includes a transaction manager module for controlling interaction with external money management devices such as automated teller machines (ATM's). The service control point of the network maintains a separate database for identifying a specific voice identification template on the basis of recognition and identification of an incoming signal as associated with a specific subscriber for a terminal and/or a telephone station. The peripheral also includes an internal data communications system carrying information between the processor, the voice verification module, the transaction monitor and the signaling communications interface.

20 Claims, 12 Drawing Sheets

U.S. PATENT DOCUMENTS

| | | | |
|---|---|---|---|
| 5,361,091 | 11/1994 | Hoarty et al. | 348/7 |
| 5,369,685 | 11/1994 | Kero | 379/67 |
| 5,396,546 | 3/1995 | Remillard | 379/96 |
| 5,410,326 | 4/1995 | Goldstein | 348/134 |
| 5,410,343 | 4/1995 | Coddington et al. | 348/7 |
| 5,418,844 | 5/1995 | Morrisey et al. | 379/207 |
| 5,465,290 | 11/1995 | Hampton et al. | 379/67 |
| 5,481,542 | 1/1996 | Logston et al. | 348/7 X |
| 5,488,411 | 1/1996 | Lewis | 348/8 |

TRANSACTION IMPLEMENTATION IN VIDEO DIAL TONE NETWORK

CROSS-REFERENCE TO RELATED APPLICATIONS

This application is related to U.S. patent application Ser. No. 08/311,461 filed Sep. 12, 1994, entitled Intelligent Peripheral in Video Dial Tone Network, attorney docket number 680-076A, which is a continuation-in-part of U.S. patent application Ser. No. 08/248,980 filed on May 25, 1994, entitled "ADVANCED INTELLIGENT NETWORK WITH INTELLIGENT PERIPHERALS INTERFACED TO THE INTEGRATED SERVICES CONTROL POINT" (attorney docket number 680-076); which is a continuation-in-part of U.S. patent application Ser. No. 07/869,931, filed on Apr. 17, 1992 (attorney docket number 680-045). The disclosure of the above cited prior applications being entirely incorporated herein by reference.

TECHNICAL FIELD

The present invention relates to a video dial tone network utilizing an Intelligent Peripheral and an Integrated Service Control Point of an advanced intelligent telephone network to perform various functions related to providing subscribers an array of broadband services including transaction authorization and implementation.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Patents disclose representative examples of such digital video distributions networks: U.S. Pat. Nos. 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple service providers through the public switched telephone network.

As the digital networks evolve to provide equal access to multiple service providers, the network functionality approaches a video "dial tone" functionality somewhat analogous to the dial tone call-up functionality available through the telephone network. FIG. 10 is a block diagram of one type of broadband network for providing interactive services, such as video on demand, home shopping or purchasing, home banking, medical information, ticket ordering, gaming, etc. from a plurality of service providers. The illustrated network is an improvement over the network disclosed in the above noted Litteral et al. Patent.

In the network shown in FIG. 10, the customer premises equipment (CPE) consists of a set top terminal type Digital Entertainment Terminal (DET) 700 and a telephone (POTS or ISDN). The connections to the network utilize Asymmetrical Digital Subscriber Line (ADSL) frequency division multiplexing technology, typically over twisted wire pair. The ADSL connection provides a 1.5 Mb/s downstream video information channel, a two-way telephone connection and a two-way 16 kbit/s control channel. The ADSL technology is described in more detail in the Litteral et al. Patent. The illustrated Video Dial Tone network architecture may use some form of fiber extension in the actual subscriber loops, to provide services to subscribers located more than 1.5 kilo-feet from a central office (see, e.g., U.S. patent application Ser. No. 08/233,579, in the name of Bruce Kostreski, filed Apr. 26, 1994, and entitled "Extended Range Video On Demand System" (attorney docket number 680-074). In the illustrated network, the drop to the subscriber's premises is always a wired ADSL loop.

In the network of FIG. 10, the DET 700 connects to an ADSL multiplexer/demultiplexer 701 similar to the in-home ADSL unit in the above discussed Litteral et al. Patent. Each ADSL subscriber line 703 will connect to an ADSL bay 705 located in or associated with the subscriber's local telephone company central office. For each subscriber line 703, the ADSL bay 705 includes an ADSL multiplexer/demultiplexer similar to the central office ADSL unit in the above discussed Litteral et al. Patent.

The ADSL bay 705 provides transport for voice signals on the subscriber loop to and from the associated voice switch 707. The ADSL bay 705 also connects to an access concentrator 709 for providing two-way signaling connections through an X.25 type packet switched data network 711. The ADSL bay 705 also receives broadband digital signals for downstream transport over the ADSL line 703 to each subscriber's premises from a digital cross connect switch 713, labelled "Access DCS" in the drawing. One ADSL line to the home carries one channel of video programming and provides a single output channel. The output channel can provide a video signal to a VCR or to the TV set 700'. The various Access DCS switches throughout the network are controlled by switch controller 712.

If the ADSL bay 705 is local, i.e., located in the same telephone company central office as the cross connect switch DCS 713, the ADSL bay 705 connects to the Access DCS 713 via an appropriate number of local DS1 connections 715. In service areas where an ADSL bay does not carry enough traffic to warrant an associated Access DCS, the ADSL bay will be located in a remote central office facility. Such a remote ADSL bay connects to the Access DCS 713 via a SONET type optical fiber link 717 providing an appropriate number of multiplexed channels to service the number of subscribers connected to the particular ADSL bay.

The Access DCS 713 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multipoint connections of one input port to a plurality of output ports.

The illustrated architecture of the Video Dial Tone network utilizes two levels of gateways, both of which will communicate with subscribers' DET's via the X.25 data network 711 and the signaling channel on the ADSL subscriber loops 703.

The level 1 gateway 721 performs a variety of network connectivity related functions, including communications port management of transmissions of information between subscribers and servers, processing of billing information and session management. Normally, each subscriber accesses the level 1 gateway (e.g., to select and access a particular VIP's server) by operation of a remote control device which causes the subscriber's DET 700 to transmit data signals to the level 1 gateway via the 16 Kb/s control channel and the X.25 packet switched data network 711. The level 1 gateway transmits one or more selection menus to the subscriber's DET 700 as screens of text data carried by the same path back through the network.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path.

The Video Dial Tone network of FIG. 10 provides video on demand and closely related interactive multimedia services. For example, using the upstream data channel, the subscriber can send a request for a particular movie, and the VIP's server will retrieve and transmit that movie as an MPEG digital data stream on the 1.5 Mb/s downstream channel to the digital audio/video processor in the subscriber's DET 700. The DET converts the digital data stream to a signal for driving a standard television set for real time viewing of the movie by the subscriber.

When the subscriber turns on the DET 700, the loader routine and/or operating system within the DET will control wake up, and the DET will transmit an initial message intended for the level 1 gateway. In the network of FIG. 10, the message is carried over the 16 kbit/s signaling channel on the ADSL subscriber's line. The access concentrator 709 uses the X.121 address of the level 1 gateway 721 and the X.121 address associated with the calling subscriber's line 703 to initiate an X.25 packet data call to the level 1 gateway 721. As part of this call, the access concentrator 709 packetizes each message from the DET 700 and adds header information to facilitate transport through an assigned virtual circuit through the X.25 network 711 to the gateway 721. In response to the initial message, the level 1 gateway 721 transmits ASCII text representing one or more pages of a VIP selection menu back to the DET 700 through the assigned virtual circuit through the X.25 network 711 and the signaling channel on the subscriber's line 703. Upon receipt of the menu data, the DET 700 would display an initial selection menu on the subscriber's television set 700'.

The subscriber may review the menu on their television set, and then input a selection using the infrared remote control device, either by moving a cursor to an appropriate point on the screen and hitting <ENTER> or by inputting digits followed by <ENTER>. In response to the VIP selection input, the DET 700 will transmit an appropriate data signal upstream through the network to the level 1 gateway 721.

As part of the X.25 call set up procedure, the access concentrator 709 identified the subscriber and included an X.121 address for the X.25 network port assigned to the subscriber in the initial signaling packet sent through the X.25 network. The level 1 gateway 721 receiving X.25 packets of DET signaling data therefore knows the X.121 address of the calling subscriber. The level 1 gateway 721 uses that information together with the VIP selection input to initiate an X.25 data call to the VIP's level 2 gateway to ask if the subscriber is a valid customer of the particular VIP. If the level 2 gateway indicates that the subscriber is valid, the level 1 gateway 721 initiates a call through switch controller 712 to instruct the appropriate digital cross connect switch DCS 713 to set up a downstream broadband link from the VIP's file server to the subscriber's DET 700 and drops the X.25 communication link to the DET. At approximately the same time, the VIP's level 2 gateway initiates an X.25 packet data call to the subscriber's DET 700. Completion of set-up of both the broadband link and the X.25 signaling link to the DET establishes an interactive video session between the VIP's gateway and server system 752 and the subscriber's DET 700.

Once a session is established, the level 2 gateway executes a two-way communication with the DET 700 through the X.25 network 711 and the signaling channel to obtain a selection or other relevant input from the subscriber. In response, the level 2 gateway provides a signal to the associated file server instructing the server to initiate transmission of selected audio/video program materials from memory through the output port which the DCS 713 has currently connected to the subscriber's line 703. The connection through the DCS routes the downstream broadband transmission to the ADSL bay 705, and within that bay, to the ADSL multiplexer/demultiplexer serving the subscriber's line for transmission over the line 703. The ADSL multiplexer/demultiplexer 701 demultiplexes the broadband signal carrying MPEG encoded audio/video material and applies that signal to the subscriber's DET 700 for decoding and display on the television set 700'.

A more detailed description of the network of FIG. 10, with particular emphasis on the network control functionality of the level 1 gateway, appears in commonly assigned U.S. patent application Ser. No. 08/304,174 filed on Sep. 12, 1994 entitled "LEVEL 1 GATEWAY FOR VIDEO DIAL TONE NETWORKS" (attorney docket number 680-093), the disclosure of which is incorporated herein in its entirety by reference.

Although the final drop into the subscriber's home is over telephone lines and some of the network equipment resides in telephone company central office buildings, the prior art video dial tone network makes no use whatsoever of routing control functionality of the existing telephone network. The gateways and servers are all separate components newly developed and added over and above the telephone network. Development and deployment of such new equipment adversely impacts the cost of implementing the video dial tone network.

Also, the use of gateways in the manner discussed above results in multiple call switching to set up a single interactive broadband session between a service provider (VIP) and the subscriber's DET. Specifically, the X.25 communication between the DET and the level 1 gateway is a first call. The X.25 communication between the level 1 and level 2 gateways to determine the validity of the calling subscriber is a second call. The switch controller 712 typically comprises another data communication system to permit the level 1 gateway to control a plurality of DCS switches. The instruction to set up a broadband link through a selected DCS therefore may also be viewed as another data call, i.e., between the level 1 gateway and the particular DCS 713 which will provide the switched broadband connection. The two-way X.25 signaling connection between the level 2 gateway and the subscriber's DET would be a fourth call, and the fifth and final call through the network would be the actual broadband link downstream from the server to the DET. Such multiple switching is an inefficient use of resources and consumes excessive time during initial set-up of sessions between the DET and the service provider's equipment.

Concurrent with recent developments in digital distribution of broadband services, the telephone industry has been developing an enhanced telephone network, sometimes referred to as an Advanced Intelligent Network (AIN), for providing a wide array of new service features (see, for example, commonly assigned U.S. Pat. No. 5,247,571). In an AIN type system, local and/or toll offices of the public telephone network detect one of a number of call processing events identified as AIN "triggers" For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signaling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference. U.S. Pat. No. 5,241,588 to Babson, III et al. discloses graphical approaches to creating and implementing new customer service procedures for individual customers of an intelligent telephone network.

To date, the AIN telephone network has been a separate technical area of development, with at most limited interaction between the AIN and the video networks. For example, U.S. Pat. No. 4,763,191 to Gordon et al. discloses a method for providing a nationwide dial-a-view service in which a caller desiring a given viewing selection dials an INWATS "800" dial-a-view number for ordering that selection through the telephone networking arrangement. A central data base system provides the originating toll office with routing instructions for sending the request to network services equipment. The network services equipment acknowledges the caller's request for cable services and processes the dial-a-view request. The network services equipment provides relevant data to cable television distribution equipment to control actual supply of requested programming to the calling subscriber. Separate vendor equipment supplies the requested programming to the calling customer via activation of an addressable decoder at the calling customer's television. The telephone network components still do not directly control actual routing of program materials through the broadband network.

As another example, U.S. Pat. No. 5,278,889 to Papanicolaou et al. discloses a two-way video telephone system using a combination of a two-way cable television distribution system and an intelligent voice telephone network. The video distribution networks used apparently are existing frequency division multiplexed analog transmission systems. As part of the disclosed call processing, a central database responds to video telephone call dialing information by providing instructions to the network to route the video portion of the call through a digital inter-exchange carrier network between points of presence of two of the cable television distribution networks.

Another on-going concurrent effort in the interactive media technology involves multiple proposals for implementing home shopping. One such proposal is described in U.S. Pat. No. 4,905,094, issued to Pocock et al. on Feb. 27, 1990. The patent relates to shopping at home through an "electronic mall". This system allows the subscribers to select which products or services they will view on their television by use of telephone or CATV keypads.

In operation, the subscriber tunes to a channel and requests connection to a remote location by dialing a predetermined telephone number. As soon as the system identifies the subscriber, the television begins to display still frame video and possibly accompanying audio information and directories of "electronic stores" comprising products or services that may be either entered or passed, examined in further detail, saved for further consideration or purchased just by touching keys on a dial tone or Dual Tone Multifrequency (DTMF) telephone or CATV keypad in response to prompts on the television screen.

In order to give the subscriber the feeling that he is in an actual store, he is first presented with a segment comprised of a series of still pictures, and possibly an accompanying audio message that may describe the various departments or types of merchandise that are available. At the same time, a menu may be displayed on the television screen naming the departments or types of merchandise the user can view and the combination of digits that must be pressed on the DTMF telephone or CATV keypad.

The video/audio presentation network essentially creates a tree of choices starting with a trunk corresponding to the main entrance, main limbs corresponding to the departments and branches corresponding to different items in each department.

When a customer has decided on a purchase, he will be presented information as to factors such as size, color and price to assist in a decision to buy.

Another approach to a broad array of interactive decision making, which includes shopping, is described in a series of patents issued to Von Kohorn and Young. These include U.S. Pat. Nos. 4,745,468, 4,876,592, 4,926,255, 5,034,807, 5,057,915, 5,128,752, 5,227,874, 5,249,044, 4,706,121, 4,977,455 and 5,151,789.

U.S. Pat. No. 5,119,188, issued Jun. 2, 1992, to McCalley et al., describes a home shopping system for interactive multimedia presentation at a subscriber's television set. A subscriber may select a particular presentation from those available as listed on a menu display. The choices permit the subscriber to perform transactions related to the presentation, such as purchasing a product advertized in the presentation, or to select another presentation.

Rhoades U.S. Pat. No. 5,187,107, issued Sep. 24, 1991, (as a continuation-in-part of U.S. Pat. No. 5,051,822) describes an interactive system utilizing both a telephone network and a cable television network. Among the services provided are mall shopping, grocery shopping and catalog sales.

Pocock et al. U.S. Pat. No. 4,905,094, issued Feb. 27, 1990, describes a shop at home service using an "electronic mall". The patent discloses a shop at home service using an "electronic mall". In operation, the subscriber tunes to a dedicated television channel and requests connection to a remote location by either dialing a predetermined telephone number, or accessing via CATV reverse channel. As soon as the system identifies the subscriber, the subscriber's television displays a still frame video menu, with accompanying audio information. Directories of "electronic stores" with associated products or services are accessed. By touching keys on a dial tone or Dual Tone Multifrequency (DTMF) telephone or CATV keypad in response to prompts on the television screen, the subscriber may enter a listed item to be examined in further detail, save the information for further consideration, or purchase the item.

From the above discussion of the prior art, it will be clear that there is still an existing need for providing an effective and efficient interactive multimedia network to permit user friendly home shopping and particularly the completion of a transaction including credit authentication and authorization.

DISCLOSURE OF THE INVENTION

The present invention addresses the need for effective and efficient implementation of purchasing and other transactions in an integrated multimedia communication system by utilizing an intelligent peripheral of an advanced intelligent telephone network to perform a variety of functions relating to interactive broadband information distribution and collection, in addition to functions for processing telephone calls. The invention eliminates the need for multiple new separate elements to provide and/or control interactive broadband services. The invention also improves call routing and switching efficiency through the video dial tone network by reducing multiple call switching to set up a complete interactive video session through the integrated network.

The present invention specifically relates to methods and apparatus using an intelligent peripheral platform of an intelligent telephone network to implement interactive transactions involving authentication of credit or debit devices such as credit or debit cards, by way of example.

In one aspect, the present invention therefore relates to an integrated communication system. The integrated system includes telephone stations and central office switching systems. The switching systems are interconnected via trunk circuits and selectively provide switched telephone call communications between the telephone stations. A separate service control point comprises a database storing call processing data for controlling at least one call processing operations of the central office switching systems. The integrated system also includes a peripheral platform (often referred to as an intelligent peripheral or "IP") connected to at least one of the central office switching systems via a telephone call connection channel. The peripheral platform comprises means for providing at least one auxiliary voice telephone call processing capability via the telephone call connection channel. For example, the peripheral platform may include a voice telephone interface, such as a voice server, for sending and/or receiving voice frequency messages and processing dialed digit information. The integrated system also includes a signaling communication system for two-way communication of data messages between the central office switching systems, between the central office switching systems and the service control point, and between the peripheral platform and the services control point. A plurality of broadband information service provider systems capable of transmitting broadband digital information and subscribers terminals connect to a broadband communication network. The terminals transmit control signals upstream in response to user inputs and provide displays in response to received digital information. The broadband communication network selectively provides broadband digital communications from the service provider systems to the terminals. The peripheral platform receives at least some of the control signals from the terminals and controls at least some broadband operations of the integrated communication network in response to the control signals.

In preferred embodiments of the integrated network, the signaling communication system comprises first and second signaling networks. The first signaling communication network provides two-way data communications between the central office switching systems and between the central office switching systems to the services control point. The second signaling communication network is separate from the first signaling communication network. The second signaling communication network provides two-way data communications between the peripheral platform and the service control point.

The peripheral platform, alone or in combination with the central control, can emulate a level 1 gateway and/or a level 2 gateway, of the prior art broadband networks, and other aspects of the invention relate to such alternate broadband communications control operations.

In some embodiments, the broadband control function of the peripheral platform controls the selective communication routing operations of the broadband communication network. Typically, the peripheral platform will receive some selection of a provider from a terminal and will control the broadband communication network to enable communication between a server operated by that provider and the subscriber's terminal. In other embodiments, the broadband control function of the peripheral platform controls operation of an actual server system.

In implementations where the peripheral platform controls the broadband network operations, the platform may offer the requesting subscriber a menu of available broadband service providers. The subscriber operates the terminal to input a selection, and that selection is transmitted to the peripheral platform. In response to that selection, the platform controls the broadband network to establish a broadband communication session between the selected provider's information server and the requesting subscriber's terminal.

The peripheral platform may also require input of a valid authorization code or PIN number before establishing a requested broadband communication session to a subscriber's terminal. For this type of restricted operation, the valid authorization code typically is stored in the database in the central control. The peripheral platform transmits an instruction message through the subscriber's terminal requesting input of a control code. When the subscriber enters a code, the platform will receive the input code from the terminal. The received code is compared to the stored authorization code, and if the code input by the subscriber matches the stored authorization code, the broadband communication network is controlled to establish the link to the terminal.

In the preferred embodiments, the peripheral platform accumulates usage time data relating to broadband communications. This usage data is processed to generate bills for broadband services.

In another aspect, the present invention relates to a peripheral platform for use in an integrated communications network providing telephone service and broadband service. In this aspect, the peripheral platform includes a telephony interface, a signaling communication interface and a processor. The telephony interface provides for connection of the platform to at least one telephone switching system in the network for transmitting voice messages and receiving and processing dialed digit information from a telephone station. The signaling communications interface also provides data communications between the peripheral platform and a central control of the network, separate from the peripheral platform and the telephone switching systems. The signaling communications interface provides data communications between the peripheral platform and a broadband digital entertainment terminal coupled to the network. The processor controls the voice telephony interface in response to instructions from the central control to provide an auxiliary telephone call processing capability. The processor also controls broadband communications through the network to provide a requested broadband service through the broadband digital entertainment terminal in response to selection signals from the terminal.

In one embodiment, the processor includes a voice recognition module for providing control capability based on received voice signals, and a voice verification module which includes a storage database for individualized voice authentication templates. The processor may also include a transaction manager module for controlling interaction with external money management devices such as automated teller machines (ATM's). The service control point of the network maintains a separate database for identifying a specific voice identification template on the basis of recognition and identification of an incoming signal as associated with a specific subscriber for a terminal and/or a telephone station. The peripheral platform also includes an internal data communication system carrying information between the processor, the voice verification module, the transaction monitor and the signaling communications interface.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Acronyms

The following detailed description uses a large number of acronyms to refer to various services and system components. Although known, use of several of these acronyms is not strictly standardized in the art. For purposes of this discussion, acronyms therefore will be defined as follows:
Advanced Intelligent Network (AIN)
Asynchronous Transfer Mode (ATM)
Central Office (CO)
Common Channel Inter-office Signaling (CCIS)
Data and Reporting System (DRS)
Digital Entertainment Terminal (DET)
Dual Tone Multifrequency (DTMF)
Host Digital Terminal (HDT)
Integrated Service Control Point (ISCP)
Integrated Service Digital Network (ISDN)
Intelligent Peripheral (IP)
Interworking Unit (IWU)
Moving Picture Experts Group (MPEG)
Optical Network Unit (ONU)
Permanent Virtual Circuit (PVC)
Plain Old Telephone Service (POTS)
Service Control Point (SCP)

Service Creation Environment (SCE)
Service Management System (SMS)
Service Switching Point (SSP)
Signaling System 7 (SS7)
Signaling Transfer Point (STP)
Telephone Operating Company (TELCO)
Transaction Capabilities applications Protocol (TCAP)
Video Information Provider (VIP)
Video Information User (VIU=subscriber)

BEST MODE FOR CARRYING OUT THE INVENTION

Figure 1A:
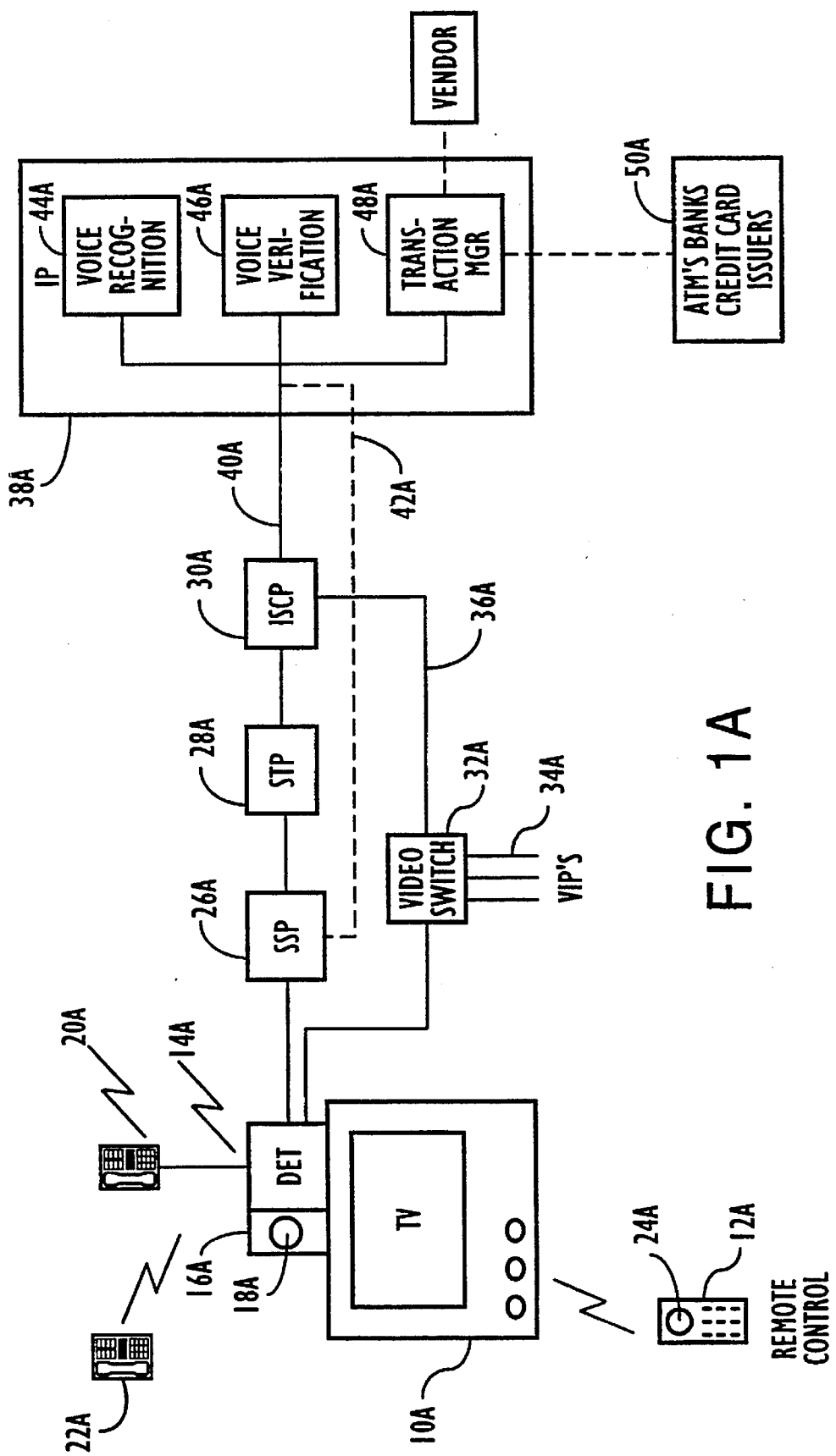
FIG. 1A is a simplified schematic diagram of a system for implementing transactions according to the present invention.

Referring to FIG. 1A, there is shown a much simplified diagram of an advanced intelligent network integrated into an interactive multimedia network providing voice, data and broadband (e.g., video) communications connectivity to implement the method and system of the invention. In that figure there is shown a television set or TV 10A having a remote control 12A. Connected to the TV is a set top Digital Entertainment Terminal (DET) 14A which has an audio module 16A having a speaker/microphone 18A for providing voice communication to and from the DET. Also connected to the DET is the residence telephone or telephone station 20A and a cordless residence telephone 22A. The remote control 12A may also be equipped with an audio section and a speaker/microphone 24A. The remote control may communicate with the TV and DET via suitable wave communications such as infrared, visible light, radio frequency or sonic. The network connection between the telephone, DET, and the connected TV may be by any one of a number of arrangements presently to be discussed in detail. Whichever connectivity is utilized will include the equivalent of a local loop connection between the telephone 20A and an end office which comprises a Service Switching Point (SSP) 26A. The SSP 26A is connected to the Advanced Intelligent Network (AIN) which includes Signaling Transfer Point (STP) 28A and Integrated Service Control Point (ISCP) 30A. The video or broadband signal is provided to the DET through connectivity presently to be described in detail via a video switch 32A receiving broadband signals from Video Information Providers (VIP's) indicated as connected at 34A. The video switch is in turn connected via a data link 36A to the ISCP 30A. It will be understood that the video switch shown in this drawing constitutes a graphical simplification of the broadband switching arrangement presently to be described in detail.

An Intelligent Peripheral (IP) 38A, also to be described in greater detail, is connected to the ISCP via a data channel 40A and is also connectable to the voice telephone network as indicated by the broken line to the SSP 42A, which connection may be established pursuant to common channel signaling from the ISCP. The IP includes a voice recognition module 44A, a voice verification module 46A and a transaction manager module 48A. The transaction manager module is connected via the public switched telephone network and its AIN facilities to external transactional devices such as automated teller machines (ATM's), banks, credit card issuers, and the like, shown at 50A.

A subscriber to the new transaction service will have stored in the data banks of the ISCP a table of information which may include the subscriber's name, directory number, a PIN number, a credit card number, a bank number, and the address of a voice verification template stored in the voice verification module 46A of the IP.

According to one mode of operation of the invention a subscribing viewer watching the display of a shopping program may initiate a transaction by indicating a desire to purchase. This transaction may be initiated in multiple ways, such as by depressing a transaction button on the remote control, speaking a command to the microphone on the remote control or the microphone associated with the DET, or by DTMF keying of a conventional telephone keypad provided either on the remote control or on the handset of the cordless phone 22A or the telephone station 20A.

The initiating signal triggers a procedure for the user to identify the product he desires to purchase and the mode of payment to be used. The latter may be by credit card, debit card, charge to his account with the advertising entity, or in his telephone bill. This procedure may be carried out through multiple implementations of the invention including the following:

(1) The shopping program may itself contain textual or oral instructions such as: "If you desire to purchase this product, enter [or speak] 123 now." These instructions may be triggered by the initiating signal or may simply be included in the program content. In the latter case, the entry of the number either by keypad or voice would constitute the initiating signal.

(2) The initiating signal may trigger the appearance of a TV menu requesting identification of the product and may include the price. The selection then may be made by the viewer in response to the menu either via the remote keypad or voice.

(3) The initiating signal may trigger an audio prompt to enter the product identification. The identification may be derived from TV display text or from information included in the audio prompt.

Identification of the product may trigger a further inquiry as to the proposed mode of payment.

Other variations of initiating signals and product, price and mode of payment identification will be apparent and may also be utilized.

Upon receiving the product identification, price, and mode of payment the DET initiates a data message to the ISCP via the SS7 common channel signaling AIN network. This may be effected by the DET auto-dialing a directory number selected by the DET processor from directory numbers associated with the products via the shopping program. Receipt of the auto-dialing signal in the SSP initiates a TCAP message which contains the identity of the calling subscriber, the product, the price and may identify the proposed mode of payment.

Upon the ISCP receiving this data message it makes a dip of the ISCP database to match the directory number of the user to the address of the user's voice authentication template in the voice verification database maintained by the IP. The ISCP may also retrieve from its database of information regarding the requesting party and payment device or mechanism, the credit or debit card number and expiration date. The ISCP thereupon dispatches a data signal to the IP processor which includes sufficient information to identify the payment device and particulars thereof and the identification of the address of the voice template. This signal results in retrieval of the voice verification template, and triggering of the voice recognition module to initiate a prompt to the user requesting the user to speak the word which the user used to create the selected template. The user thereupon speaks the identifying word via the voice circuit 42A established between the DET and IP. The word voiced by the user is then compared with the voice represented by the template and upon a match being found, the IP processor causes the transaction manager to complete the transaction by dispatching an appropriate order message to the vendor including the necessary billing information for charging to a credit card or by debiting the user's bank account via a debit message to the ATM or bank. An important advantage of this methodology is its ability to implement the transaction utilizing the existing public switched telephone network with associated AIN capabilities. The same networks may be used in conjunction with the IP to create and store the voice authentication template. A caller seeking to subscribe to the service may be prompted to establish a voice template by speaking a specific word one or more times to enable creation of the template under control of the IP processor. This template is then stored in the database at the IP at an address which is identified to the ISCP for storage of the ISCP database along with data relating to the credit or debit devices which the subscriber chooses to make of record for subsequent use. The details of the integrated networks usable to carry out the foregoing method and of the elements used in those networks is now described in detail.

Figure 1B:
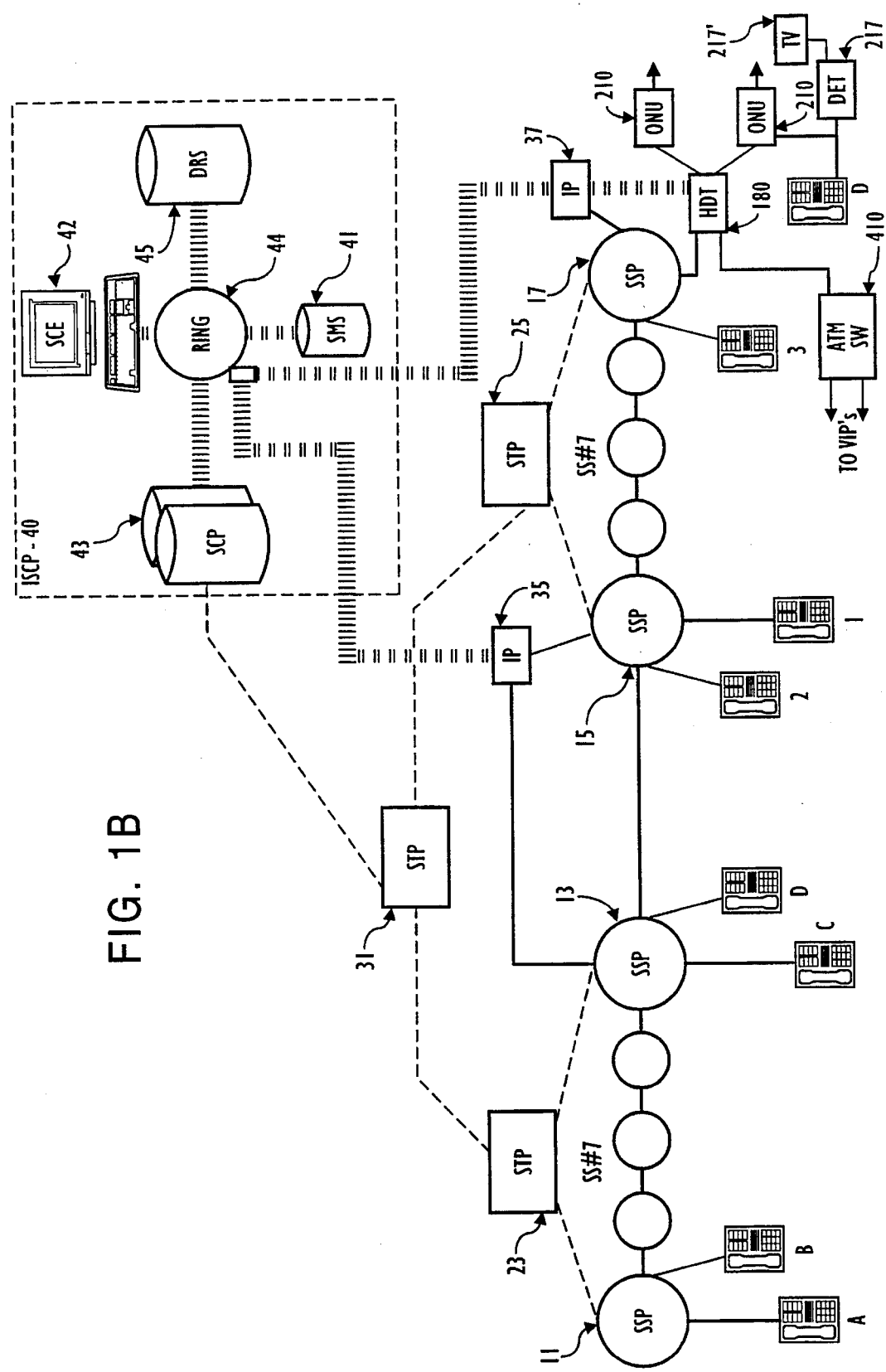
FIG 1B is a schematic block diagram of a the telephone communication portion of an Advanced Intelligent Network in accord with the present invention, with a simplified functional illustration of some of the broadband network components.
Figure 1C:
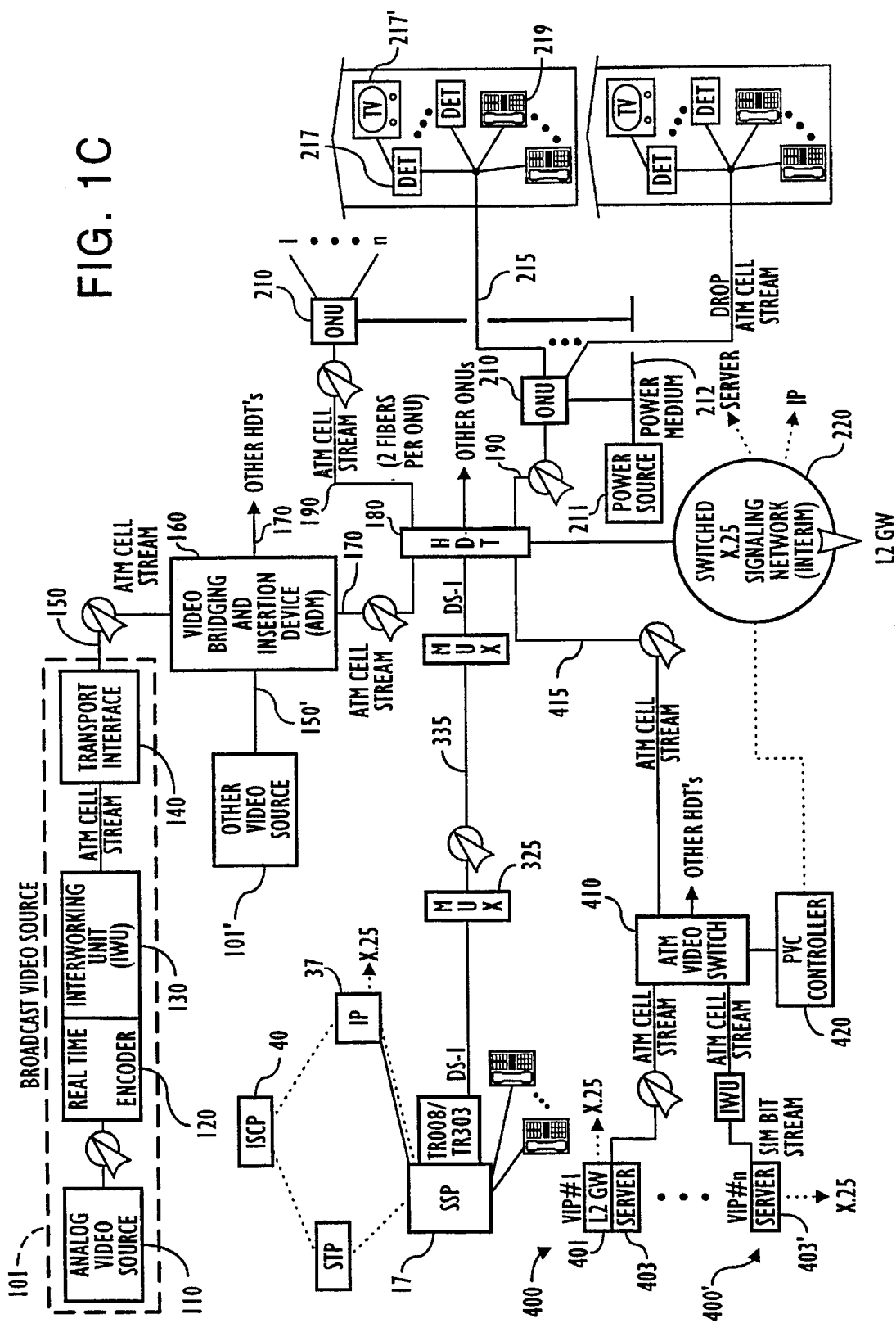
FIG. 1C shows in more detail an exemplary broadband distribution network connected to several components of the system of FIG. 1A, to form an integrated network in accord with the present invention.

FIG. 1B illustrates an integrated advanced intelligent network providing voice, data and broadband (e.g., video) communications connectivity. FIG. 1C is an alternate view of that network showing the data and broadband communications elements in more detail. In the typical situation, a local telephone operating company (TELCO) would deploy, operate, and maintain such an integrated network.

In the network shown in FIG. 1B, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

As shown in FIG. 1B, all of the end office switches 11, 13, 15 and 17 are equipped and programmed to serve as SSP's. The illustrated embodiment is perhaps an ideal implementation which would make a variety of Advance Intelligent Network (AIN) services widely available at the local office level throughout the network. Other AIN implementations provide the SSP functionality only at selected points in the network, and end offices without such functionality forward calls to an SSP switching office having tandem switching capabilities.

SSP capable central office switching systems typically consist of a programmable digital switch with CCIS communications capabilities. One example of an SSP capable CO switch is a 5ESS type switch manufactured by AT&T; but other vendors, such as Northern Telecom and Siemens, manufacture comparable digital switches which could serve as the SSP's. The structure of an exemplary CO which may serve as the SSP type CO's in the system of FIG. 1A will be discussed in more detail below, with regard to FIG. 2.

With reference to FIG. 1B, the SSP type CO's 11 and 13 connect to a first local area STP 23, and the SSP-CO's 15 and 17 connect to a second local area STP 25. The connections to the STP's are for signaling purposes. As indicated by the circles below STP's 23 and 25, each local area STP can connect to a large number of the SSP-CO's. The central office SSP's are interconnected to each other by trunk circuits (illustrated in FIG. 1B as bold lines) for carrying telephone services.

The local area STP's 23 and 25, and any number of other such local area STP's (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSP's or not, may function primarily as tandem type offices providing connections between trunk circuits only.

The links between the central office switching systems (CO's) and the local area STP's 23 and 25 are typically SS7 type CCIS inter-office data communication channels. The local area STP's are in turn connected to each other and to the regional STP 31 via a packet switched network. The regional STP 31 also communicates with the ISCP 40 via a packet switched network.

The above described data signaling network between the SSP type central offices and the ISCP is preferred, but other signaling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID, second alternate carrier ID, a routing number,and a destination number. The TCAP specifies a number of additional message formats. For example, a format for a subsequent query from the SSP, and formats for "INVOKE" messages for instructing the SSP to play an announcement or to play an announcement and collect digits and a "SEND TO RESOURCES" message instructs the SSP to route to another network node.

There may be one or more ISCP's per state, to avoid overloading existing CCIS data links. Alternatively, the ISCP could be implemented on a LATA by LATA basis or on a regional operating company basis, i.e., one database for the entire geographic area serviced by one of the Regional Bell Operating Companies. In fact, if federal regulations permitted, the database service could become nationwide.

As shown, the ISCP 40 includes a Service Management System (SMS) 41, a Data and Reporting System (DRS) 45, and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44.

The SCP database 43 stores data tables used to control telephone services provided through the network to callers using telephone stations. The SCP 43 also stores at least some data for controlling broadband services through the integrated network and may store the data necessary to implement the method of the invention as described above.

Figure 2:
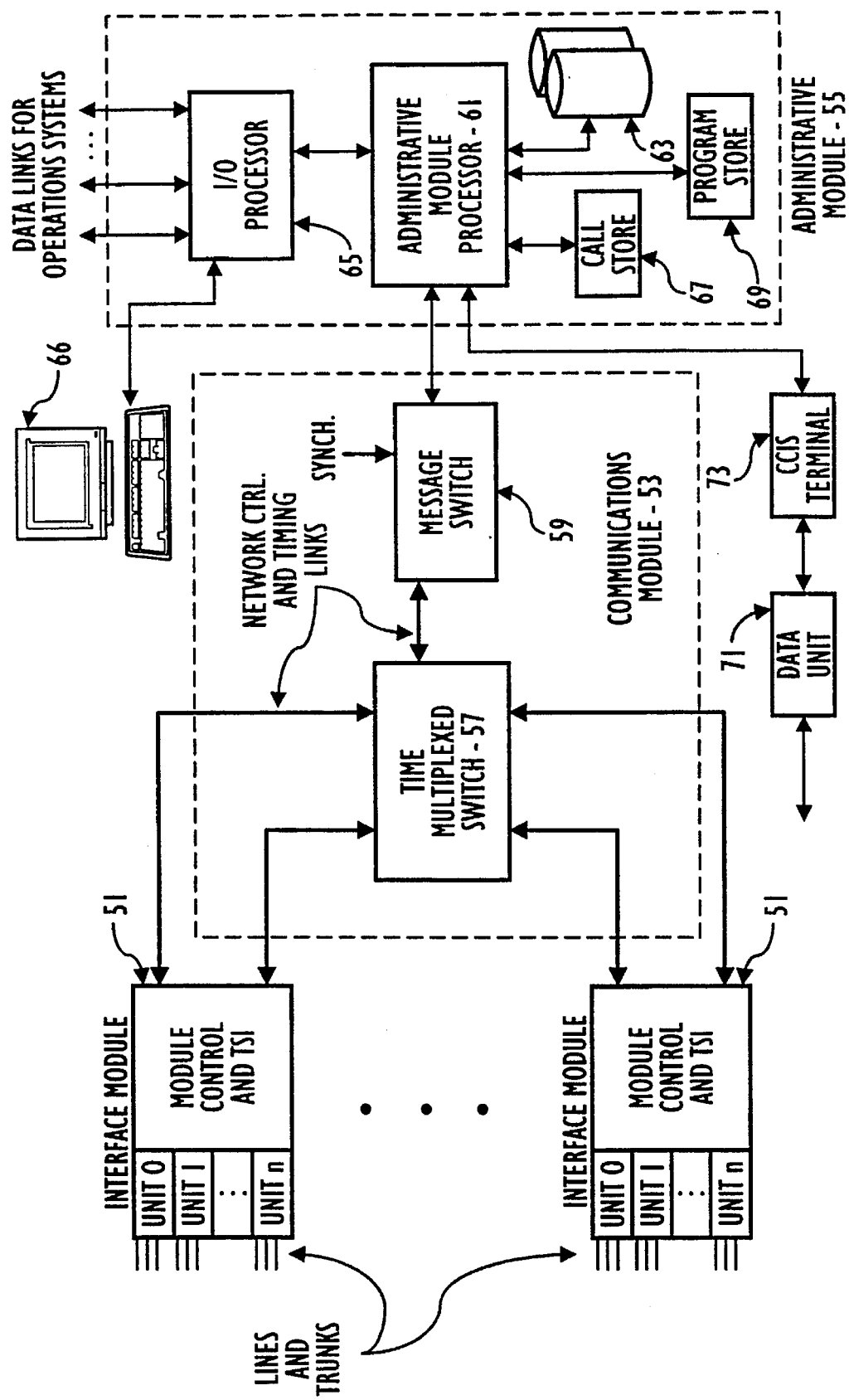
FIG. 2 is a more detailed diagram of one of the SSP type central offices used in the preferred intelligent network implementation of the present invention.

FIG. 2 is a simplified block diagram of an electronic program controlled switch which may be used as any one of the SSP type CO's in the system of FIG. 1A. As illustrated, the CO switch includes a number of different types of modules. In particular, the illustrated switch includes interface modules 51 (only two of which are shown), a communications module 53, and an administrative module 55.

The interface modules 51 each include a number of interface units O to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disk storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signaling link between the administrative module processor 61 and an SS7 network connection to an STP or the like (see FIG. 1A), for facilitating call processing signal communications with other CO's and with the ISCP 40.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disk storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Although shown as telephones in FIGS. 1B and 1C, the voice grade type terminals can comprise any communication device compatible with a voice grade type telephone line. As used herein, the term "telephone station" broadly encompasses telephones and any other devices compatible with a voice grade telephone circuit, for example, station devices such as facsimile machines, modems, etc. Also, although all of the links to the telephone stations are illustrated as lines, those skilled in communications arts will recognize that a variety of local transport media and combinations thereof can be used between the end office switches and the actual telephone stations, such as twisted wire pairs, subscriber loop carrier systems, radio frequency wireless (e.g., cellular) systems, etc.

In accord with the present invention, one or more Intelligent Peripherals (IP's) are added to the network to provide one or more auxiliary call processing capabilities both for voice calls and broadband (typically video) calls. As shown in FIG. 1B, two of the SSP type central offices 13 and 17 connect to Intelligent Peripherals 35 and 37, respectively. In the preferred embodiment, the IP's each connect to the associated SSP switch via a primary rate Integrated Services Digital Network (ISDN) link through an appropriate interface unit in one of the interface modules 51 of the switch (see FIG. 2). The ISDN link carries both voice and signaling data. The IP's also connect via a packet switched data communication network, such as X.25, to the ISCP 40 and to Host Digital Terminals (HDT's), as discussed in more detail below with regard to FIG. 1C. The X.25 data communication network forms a second signaling network separate from the SS7 network and the network of trunk circuits interconnecting the switching offices.

The network of FIG. 1B also provides integrated voice telephone service and broadband services to certain customers. As illustrated, at least one SSP end office 17 connects to a host digital terminal (HDT) 180. The HDT also receives broadband inputs from an ATM (asynchronous transfer mode) switch and from other sources (not shown) as discussed later. The HDT 180 provides broadband services through optical fibers and optical network units (ONU's) 210 to subscribers telephones and digital entertainment terminals (DET's) 217.

A central office switching system or CO shown in FIG. 1B normally responds to a telephone service request on a local communication line connected thereto, for example, an off-hook followed by dialed digit information, to selectively connect the requesting line to another selected local communication line, e.g., to establish a voice call communication link from telephone station A to telephone station B. The connection can be made locally through only the connected central office switching system. For example, for a voice telephone call from station A to station B, the SSP-CO 11 provides the call connection without any connection to another central office. When the called line connects to a distant station, for example, when station A calls station C, the voice connection is made through the connected central office switching system SSP-CO 11 and at least one other central office switching system SSP-CO 13 through the telephone trunks interconnecting the two central office switches.

In the illustration in FIG. 1B, many telephones such as stations A, B and C, connect to end office SSP's via standard existing telephone lines (or equivalents thereof). Subscribers to integrated communications services, however, communicate to an end office SSP, such as SSP 17, via transport media and routing components capable of transporting voice telephone signals as well as data and broadband information. To a user of a telephone station connected to integrated service lines, however, the telephone functionality appears to be the same as plain old telephone service, i.e., to the user of telephone station D, the calling operations and quality of services appear identical to those available to a person using telephone station A. Exemplary techniques for providing telephone service to a station such as telephone station D are discussed in more detail below with regard to FIG. 1C.

In the normal plain old telephone service (POTS) type call processing, the central office switching system responds to an off-hook at one of the telephone stations and receives dialed digits from the calling station. The central office switching system analyzes the received digits to determine if the call is local or not. If the called telephone station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office. For example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between telephone stations. In an integrated voice and broadband AIN type network in accord with the present invention, these normal call processing routines would still be executed for completion of POTS calls not requiring AIN processing, service features provided by the Intelligent Peripherals, or broadband services.

In an Advanced Intelligent Network (AIN) type system, such as shown in FIG. 1B, certain telephone calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disk memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive auto-dialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary voice grade telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signaling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by the peripheral platform, the call control message would instruct the SSP to route the call to the associated peripheral platform.

In the network of FIG. 1B, the ISCP 40 transmits a "SEND to RESOURCE" type TCAP message instructing an SSP, such as SSP 17, to access a resource and collect digits. This message identifies a particular resource, in this case an ISDN type voice channel to the associated peripheral announcement platform 17A. Each time the ISCP sends such a "SEND to RESOURCE" message to an SSP, the ISCP concurrently sends a message through the X.25 data link to the associated peripheral announcement platform. This message tells the platform what message to play on the specified ISDN channel at that time. If the message announcement platform has a text-to-speech converter, the announcement could take the form of virtually any desired script.

The IP 37 performs DTMF digit collection and voice announcement functions on telephone calls for a wide variety of telephone services available through the network. According to the invention and as discussed in more detail later, the IP provides voice recognition capabilities for such interactions. Advanced implementations of the IP will also include various data communications means, e.g., for FAX mail services, screen-phone services, etc. The IP 37 also performs a number of functions relating to control of broadband services through the integrated network.

The illustrated preferred embodiment includes two signaling communications systems carrying data to and from the ISCP 40. The communications links of the first such signaling network appear in the drawing as dashed lines, and the communications links of the second such signaling network appear in the drawing as lines formed by parallel bars. The first signaling network provides communications between the ISCP 40 and the SSP's 11, 13, 15, 17 and between the individual SSP's 11, 13, 15, 17. The second signaling network provides communications between the ISCP 40 and the IP's 35, 37. More specifically, the SCP 43 connects to the SSP's via the SS7 network and the STP's 44. For the second signaling communication system a router shown as a small rectangle on the ring 44 provides a two-way communication connection to a data network, for example an Ethernet (IEEE 802.3) type local area network, another token ring, or a mixture of token ring and local area network, etc., going to the individual IP's 35, 37. Other types of high speed data networks can be used between the ISCP 40 and the IP's 35, 37. Typically, the second signaling network will provide higher capacity data transport than the first signaling communication network.

One IP may connect to one SSP. Alternatively, an IP may connect to two or more switching systems, or two or more IP's may connect to the same switching office. For example, in the illustrated network, the IP 35 connects to two SSP type central office switching systems 13, 15. The IP 37 connects to one SSP type central office switching system 17. The precise number of IP's in the network and the number thereof connected to different switching systems is determined by projected traffic demands for IP service features from the subscribers' lines connected to the various switching systems.

In the preferred embodiment, the connection from the IP to the SSP would utilize a primary rate ISDN type trunk line for carrying both voice channels and signaling information. However, a number of alternate implementations of this connection can be used. For example, the connection may take the form of a T1 circuit carrying a number of Multi-plexed Centrex line channels. If additional data signaling is necessary from the switch to the IP, a Simplified Message Desk Interface (SMDI) link can be provided. SMDI is a standard form of maintenance port, available on many types of telephone switching systems, through which calling party number information can be supplied. For older switching systems not capable of call transfer through ISDN signaling or signaling on T1 Centrex lines, an additional switch could be added between the IP and the SSP.

The AIN topology illustrated in FIG. 1B is exemplary in nature, and other network topologies can be used. For example, the illustrated networks include SSP functionality in each of the end office switching systems. In some networks, at least some of the end offices may not have SSP capabilities. Each such end office would connect to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIG. 1A. In such networks, each peripheral announcement platform or IP could connect to one or more of the non-SSP end offices, one or more SSP capable end offices and/or to the SSP capable tandem. The SSP capable tandem office switch is a digital switch, such as the 5ESS switch from AT&T. The non-SSP type end offices might be 1A analog type switches.

FIG. 1C shows the telephone portions of the network in less detail than FIG. 1B, but FIG. 1C illustrates the broad-band distribution systems and associated control signaling network in greater detail. The integrated broadband network of the present invention will provide broadcast video distribution, archival video services and interactive multi-media services as well as a suite of narrowband services including plain old telephone service.

FIG. 1B includes a simplified illustration of a portion of the broadband distribution elements of the integrated network. Subscribers having broadband service would obtain all services through optical fiber connections to an HDT 180 and an ONU 210. A single drop may be used between the ONU 210 and the subscriber premises to carry voice, signaling and broadband information. Only a single connection is illustrated for simplicity. In the currently preferred-embodiment, a coaxial cable carries the downstream broad-band information and the two-way signaling information between the ONU 210 and the DET's 217 (only one shown) on the subscriber premises. A separate twisted wire pair carries telephone service signals (POTS or ISDN) between the ONU and the telephone station(s) D at the subscriber premises.

The HDT communicates with the SSP type CO 17 for providing connected subscribers with telephone services. In this regard, the HDT, the ONU, and the optical fibers effectively function as an optical type subscriber loop carrier system. The SSP processes outgoing telephone calls from telephone type equipment, such as station D, as well as incoming calls directed to that equipment in essentially the same manner as for calls to lines having only POTS type service, e.g., to standard telephone stations 1 and 2.

To provide broadband video services, the HDT 180 receives ATM broadband signals from an ATM switch 410 and from other sources such as broadcast ATM sources or servers shown in more detail in FIG. 1C. The HDT also conducts signaling communications with the IP 37 and with other components discussed in more detail below, to provide subscriber requested broadband services through the DET 217 and the associated television set. In the drawings, the broadband components are shown in association with only one SSP and one IP, for simplicity only. In a network servicing a large number of broadband subscribers, there would be additional broadband components associated with other TELCO switching offices, and based on traffic demands, other subscribers would be serviced through other IP's.

Figure 10:
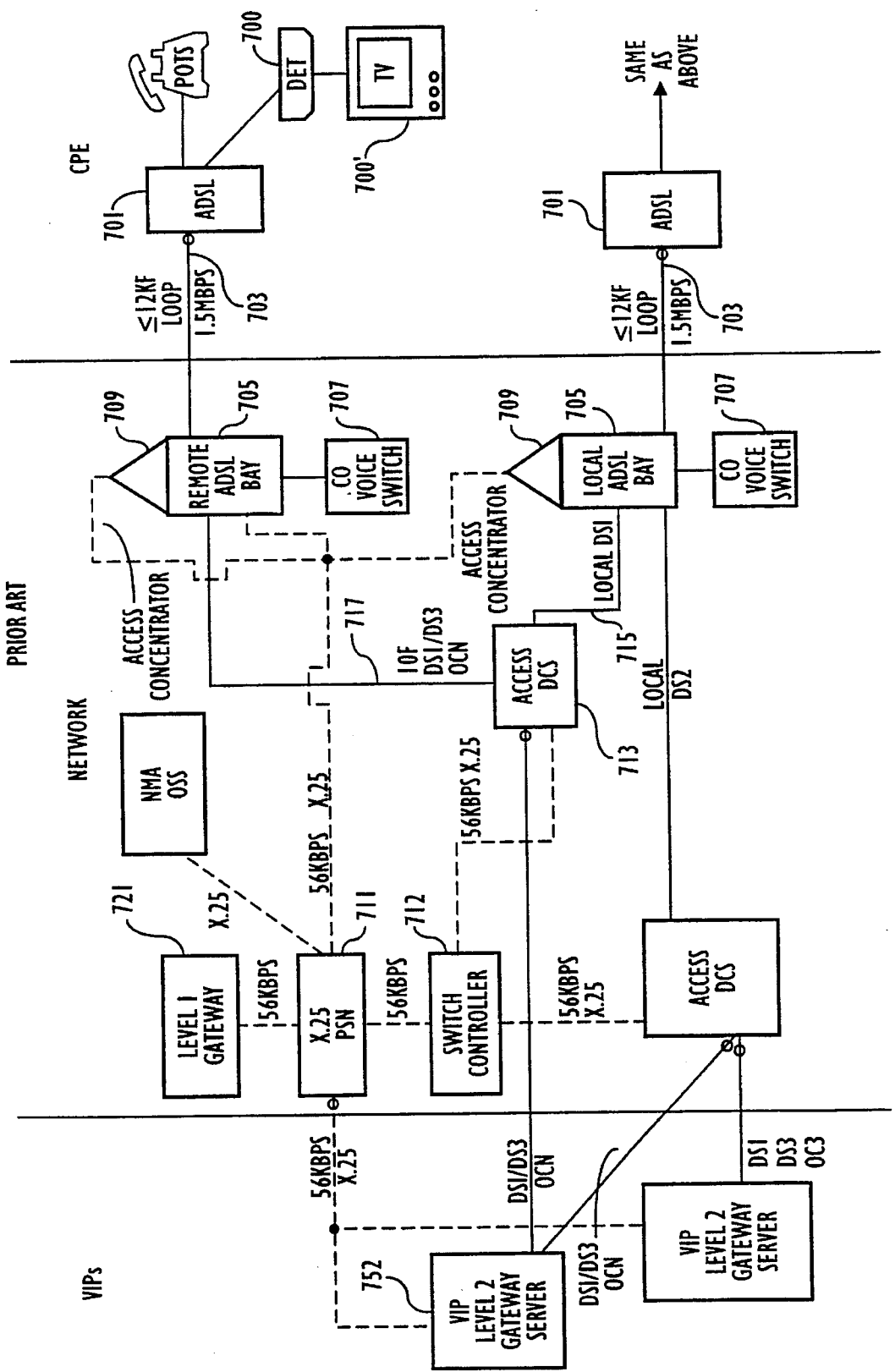
FIG. 10 illustrates an exemplary prior art configuration of a video dial tone network.

In this embodiment of the invention, the IP cooperates with the ISCP to perform functions similar to those of one or more of the gateway devices in the prior art network of FIG. 10. Also, the invention could be practiced in a network using ADSL technology and/or digital cross connect switching similar to the those features in the prior art network or in a hybrid fiber coax network using radio frequency transport of digitized, compressed video signals as in the Ser. No. 08/304,174 (680-093) case noted earlier. The illustrated embodiment, however, utilizes an advanced fiber to the curb system with ATM (Asynchronous Transport Mode) transport, similar to one of networks disclosed in commonly assigned application Ser. No. 08/250,792, filed May 27, 1994, entitled "Full Service Network" (attorney docket number 680-080), the disclosure of which is incorporated herein entirely by reference. The invention could easily be adapted to control a variety of other types of video dial tone networks.

As illustrated in FIG. 1C, the broadcast video services will initiate from a broadcast video source or server 101. The broadcast server 101 includes an actual analog video source 110. Although only one is shown, a typical broadcast service provider will have a plurality of such sources. The analog signal from the source is carried by any convenient means, such as an optical fiber, etc. Means (not shown) are provided as necessary to convert analog video transmission signals, e.g., NTSC broadcast signals, to baseband video and audio signals. The baseband signals are applied to a real-time encoder 110.

The real-time encoder 110 digitizes the audio and video signals and performs data compression. As currently envisaged, the encoder will encode the program signal into an MPEG 2 format although other digital compression encoding schemes may be used, such as DIGICIPHER™. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

The illustrated real-time encoder 120 preferably is set up as a bank of encoders to process six sets of analog audio/video program signals in parallel. As such, the bank of encoders 110 produces six 6 Mbits/sec MPEG 2 bit streams, which are combined together with appropriate overhead information into a single 45 Mbits/sec DS-3 type signal. The DS-3 signal from the encoder 110 is input to an interworking unit (IWU) 130. The interworking unit 130 is the actual input point for the encoded broadcast video information into the network.

The exemplary network illustrated in FIG. 1C utilizes asynchronous transfer mode (ATM) switching to transport all video information, including the broadcast video information. ATM is a packet oriented time division multiplexing technique. In ATM, information is organized into cells having a fixed length and format. Each cell includes a header, primarily for identifying cells relating to the same virtual connection, and an information field or "payload". In one proposal, a 53 octet ATM cell would include a cell header consisting of 5 octets and a payload consisting of 48 octets of data. The ATM cell header information includes a virtual circuit identifier/virtual path identifier (VCI/VPI) to identify the particular communication to which each cell relates. For example, for broadcast signals, the VCI/VPI will identify a particular program channel. For a point to point transmission, e.g., for video on demand, the VCI/VPI in each header of the ATM cells would effectively identify a specific end point of the virtual communication link.

ATM transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation, all video materials will be transferred at a constant, standardized bit rate, however, preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

The interworking unit (IWU) 130 grooms the continuous MPEG 2 bit streams of the broadcast services for ATM cell stream transmission over optical fiber transport links. For example, the interworking unit will divide the bit stream into appropriate length payloads and combine the payload data with appropriate cell headers, necessary for ATM transport. In an initial implementation, downstream links would carry an OC-12 bit rate, but higher rate transports such as OC-48 will be used in later implementations. Assuming use of OC-12, one such transport link will normally carry the equivalent of 12 DS-3's. However, conversion into ATM cell format with associated headers imposes added overhead requirements on the data transmissions. In the presently preferred embodiment, one interworking unit 130 therefore processes up to ten DS-3 signals to produce an ATM bit stream at the OC-12 rate.

A transport interface 140 converts the electrical signal from the interworking unit 130 into an optical signal and transmits the optical signal through fiber 150 to an adaptive digital multiplexer (ADM) identified in the drawing as a video bridging and insertion device 160. The ADM 160 performs three functions, passive bridging, active bridging, and insertion of signals from other broadcast service providers (if any). The three functions may actually be separate, but in the preferred embodiment would be performed by elements co-located within the one network component ADM 160.

As noted above, the real time encoders 120 each output a single DS-3 signal comprising up to 6 MPEG 2 bit streams. The interworking unit 130 processes up to ten DS-3 signals to produce an ATM bit stream at the OC-12 rate. Consequently, one broadcast video source 101 may produce as many as 60 channels of CATV type broadcast programming for transport over one OC-12 type SONET optical fiber 150. Many providers, however, may not choose to broadcast so many channels. For example, the provider operating broadcast video source 100 may offer only 42 channels. Such an ATM channel transmission on the optical fiber 150 will not utilize the entire OC-12 channel capacity of that fiber. In the specific example, the 42 channels together require the equivalent of 7 of the available 10 DS-3's.

The illustrated architecture permits a second broadcast service provider to utilize the transport capacity not used by the first provider. The second broadcast service provider would offer additional channels from a separate second source 101'. The broadcast source type server 101' is essentially identical in structure and operation to the source server 101, but the source/server 101' will offer up to the number of channels necessary to fill the OC-12 transport capacity. In the example, if the source 101 transmits 42 channels (7 DS-3's) via the fiber 150, the second source 101' could transmit up to 18 additional channels (3 DS3's). The function of the insertion device in the ADM 160 is to combine the signals from the two sources into a single OC-12 rate signal (10 DS-3's in ATM cell format) for further transmission through the optical network.

The two bridging functions facilitate dissemination of the broadcast material throughout the entire network. The passive bridging elements are optical splitters for splitting one OC-12 optical signal from the insertion device into a number of duplicates thereof, e.g., 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 170 to host digital terminals throughout the network service area. The host data terminal (HDT) 180 is shown as a representative example.

When a subscriber requests a specific broadcast channel, the digital entertainment terminal (DET) in the subscriber's home provides a signal identifying the selected channel to the HDT 180. The signaling between the digital entertainment terminal (DET) and the HDT 180 and the real time control of the routing by the HDT 180 will be discussed in more detail below. Inside the HDT, the ATM cell stream from an optical fiber 170 is applied to a bus. To carry larger numbers of channels, there would be duplicate sources, insertion devices and bridging elements to transport the additional channels over fibers parallel to the illustrated fibers 170. Signals from one or more such additional parallel fibers would be applied to corresponding parallel buses inside HDT 180.

One HDT will communicate with a large number of optical network unit (ONU's) via pairs of optical fibers 190. As currently envisaged, each home or living unit will have as many as four DET's. Each ONU 210 and the downstream fiber of the pair 190 to the ONU 210 will provide downstream video services to a number of homes, e.g., 8 to 24. The transmissions on the downstream fibers between the HDT and the ONU's 210 are synchronous, although the video information remains in ATM cell format. Each DET served by an ONU 210 is assigned a specified time slot on the downstream fiber of a pair 190.

The HDT 180 includes a component which is essentially a non-blocking type ATM switch. In response to the selection signal from a DET, the HDT 180 accesses the appropriate bus and identifies each ATM cell on that bus for which the header information indicates that the cell represents information for the selected broadcast channel. The identified ATM cells are bridged by the ATM switch from the bus to a line card providing transmissions over the optical fiber 190 to the particular ONU 210 which services the requesting subscriber's premises. When the HDT selects each ATM cell for transmission to a specific DET, elements on the line card communicating with the particular ONU will buffer the cell as necessary and place the cell in the time slot for that DET on the downstream fiber of optical fiber pair 190. The cells selected for a particular DET, together with cells going to other DET's served by the same ONU multiplexed into their respective time slots, are applied to an electrical to optical converter and transmitted over the downstream fiber to the ONU 210 serving the particular subscriber's premises.

The basic purpose of the ONU 210 is to disaggregate the HDT side links into individual customer links and provide optical to electrical conversion for electrical delivery to the individual subscriber's premises. Although depicted as a single line in FIG. 1C, in the current implementation, the drop cable to each subscriber's premises comprises a coaxial cable for carrying the video and/or digital data signals and a twisted wire pair for carrying telephone signaling. Alternatively, ADSL communications over twisted wire pair could be used between the ONU and the subscriber's premises. In the preferred embodiment, the ONU 210 includes means to convert optical signals received over the downstream fiber of the pair 190 to electrical signals and transmit signals from each DET's assigned time slot down over the coaxial cable to the subscriber's premises. The ONU 210 also provides two-way conversion between optical and electrical signals for voice telephone service over the twisted wire pairs and for the signaling channels to/from the DETs.

Each DET 217 includes means to receive selection signals from a user and transmit appropriate data signals over a narrowband channel on the coaxial drop cable to the ONU 210. The ONU multiplexes the data signals from the DET's it services together and transmits those signals to the HDT over an upstream fiber of the optical fiber pair 190. The HDT 180 transmits the upstream control signals to the IP 37 which performs the function of a level 1 gateway and to provider service control elements referred to as level 2 gateways. In an initial implementation, the HDT's 180 communicate with the IP 37 and the gateways through an X.25 type data network 220. As noted above, the IP's also communicate with the ISCP 40 via a packet switched data communication network, such as X.25. The X.25 network 220 may carry this data traffic, or the communications between the ISCP 40 and the IP's may use a separate packet switched data network. Future implementations will use ATM communications to transport the signaling information.

A power source 211 supplies −130 V dc and battery reserve power for at least telephone service to the ONU's 210. The power source 211 may connect to the ONU's via twisted pairs, but in the preferred embodiment, the power is carried over a coax distribution cable.

At the subscriber premises, a network interface module (NIM) couples the set-top device or digital entertainment terminal (DET) 217 to the coaxial drop cable of the distribution network. In this Network configuration, the NIM includes appropriate means to select ATM cells from its assigned time slot on the coaxial cable and strip off the ATM header information and reconstitute the digital payload data, e.g., into MPEG packetized information. The NIM also provides two way signaling for transmission of narrowband data through the network, typically for control signaling purposes.

In the illustrated network, the DET 217 also includes a CPU comprising a 386 or 486 microprocessor with associated memory (RAM, ROM and EPROM), as well as an audio/video decoder controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The MPEG demultiplexer routes data packets from the MPEG stream to the CPU for further processing, e.g., as downloaded data and/or control programming or as graphic/text information. The DET 217 also includes a graphics display generator for generating displays of received graphics and text data output by the CPU, such as the initial turn-on selection menu, discussed in more detail below. The DET 217 also includes digital to analog converters and appropriate drivers to produce output signals compatible with a conventional television set 217' from the decoded audio/video information and the graphics display. Each DET also includes means to receive selection signals from a user and transmit appropriate data signals over a narrowband channel through the particular video network.

The digital entertainment terminal (DET) 217 is a programmable device to which different applications programs will be downloaded from the IP or from an information provider's level 2 gateway device, in order to permit the DET to interact with different information service providers and thereby offer the user totally different types of services. At least one VIP, typically a vendor of the DET 217, also can download portions of the operating system. The DET 217 will permanently store only an operating system and a loader program, to control initial communications with the HDT 180 and the IP 37. Based on this loader routine, the DET 217 will normally wake up in a CATV-like mode of operation for selecting and receiving broadcast programs, and the DET 217 will offer the video information user (VIU) the option to select initiation of a call to an interactive service provider through the IP.

The structure and operation of the DET 100, outlined above, are described in more detail in commonly assigned application Ser. No. 08/250,791, filed May 27, 1994, entitled "Dynamically Programmable Digital Entertainment Terminal" (attorney docket no. 680-083), the disclosure of which is entirely incorporated herein by reference.

In addition to its various functions relating to telephone services discussed above, the IP 37 provides primary control of all routing and access functions of the broadband communications through the network and accumulates various usage statistics for broadband and interactive multimedia services. The control functions may include controlling access to broadcast programs by individual subscribers. Control of access to on-demand programming and interactive multimedia services through a PVC controller 420 and an ATM switch 410 will be discussed in more detail below. The IP 37 may also transmit narrowband information to each DET 217 instructing it to initiate display of various selection menus of available video information service providers and messages relating to ongoing interactive call set-up processing such as described in the initiation steps of the process of this invention described above.

The IP 37 maintains or has access to a data base of video information service providers and customer profile data for the broadcast, archival and interactive video services available through the network. This data may include the speech templates, voice recognition and transaction management data necessary to the functions of that portion of the IP shown at 38A in FIG. 1A and described in the method of the invention set forth hereinabove. This data may also include customized menus, pre-subscription information, identification of impulse pay-per-view events and premium channels, etc. Under different circumstances, the video information providers and/or the individual customers can access this data for provisioning.

When the subscriber selects a specific broadcast channel, the DET 217 transmits data upstream through the various network elements to the IP 37 identifying the selected channel. In response, the IP 37 accesses stored data regarding the broadcast services to which the customer currently subscribes. If the customer subscribes to the requested service, such as the service of this invention, the IP transmits an instruction to the HDT 180 to route the cells for that channel to the subscriber's DET in the manner discussed above. If the customer is not currently a subscriber to that service, the IP 37 transmits a data message back to the DET 217 instructing it to provide an appropriate display, e.g., informing the customer of a service denial and/or asking the subscriber for appropriate inputs to initiate a new subscription. As discussed in more detail below regarding point to point communications with interactive providers, the IP 37 can also execute a PIN number control function, in this case, however, to limit access to certain broadcast or other services.

The above selection procedure, with real-time control through IP 37, provides the gateway program or module within the IP with information as to each selection a subscriber makes and when the selection is made. The IP 37 also receives information as to when a DET session ends, e.g., upon turn-off of the DET or upon request for a session with a different provider or for receipt of a different broadcast channel. As such, the IP 37 has all information necessary to accumulate a variety of statistics as to viewer usage, both for billing purposes and for audience accounting purposes.

As an alternative to the real time control of broadcast program selection and access by the IP 37, certain relevant control data could be downloaded to each HDT 180 from the IP. With this modification, the broadcast VIP's would provide provisioning data to the IP, and the IP would periodically download that data to the appropriate HDT's through the X.25 signaling network 220.

The provisioning data downloaded to the HDT's 180 would include broadcast channel mapping information and subscriber authorization control information. The channel mapping information specifies what programs are carried on each ATM virtual circuit, within each DS-3, on each respective optical fiber 170. The HDT 180 accesses the channel mapping information in response to each program selection by a subscriber to route the corresponding ATM cell stream to the requesting DET 217. The authorization control data would indicate which program each subscriber is authorized to access, e.g., because that party has subscribed to the particular program service and is not delinquent in bill payments. When a subscriber requests a program, the HDT 180 checks this data to determine whether or not to supply the program to the subscriber's DET 217. As the HDT 180 routes selected channels to the DET's 217, the HDT would accumulate usage data for the subscribers serviced thereby. The HDT 180 would periodically upload such usage data to the IP 37 for subsequent transmission to appropriate billing systems of the network service provider. The HDT 180 would access the IP 37 for real-time signaling only under certain limited circumstances, e.g., when data in the HDT indicates access to a selected broadcast service requires a PIN number procedure.

In addition to broadcast video, the network offers subscribers access to other wideband services, such as video on demand and interactive multimedia services. Access to these additional broadband services is through an ATM switch 410, however the access through this switch is controlled by the IP 37 and the PVC controller 420.

Each of the non-broadcast broadband service providers 400 will have a level 2 gateway 401 and some form of broadband file server 403. The provider's system may provide ATM cell stream outputs for transmission through the network. Alternatively, if the provider's equipment transmits only MPEG bit stream data, the network operator would supply an interworking unit (IWU) similar to the unit 130 discussed above, to convert the provider's bit stream data into an ATM cell stream format compatible with the illustrated network. The ATM switch transmits selected ATM cells via optical fibers 415 to the HDT's 180.

To establish a broadband communication session or connection through the network between an information service provider 400 and a particular DET 217 requires establishment of a virtual circuit through the ATM switch 410 and the appropriate HDT 180. A PVC controller 420 stores data tables defining all possible virtual circuits through the ATM switch 410 and the HDT's 180 to each terminal of a customer subscribing to a particular provider's services. These data tables define the ATM header information (VCI/VPI) and the particular fiber output needed to route cells to the correct HDT 180 and the time slot information on the downstream fiber to the appropriate ONU 210 serving each DET 217. The data tables thus define "permanent virtual circuits" (PVC's) between the providers and the DET's.

The ISCP 40 stores routing control information which the IP 37 accesses to control processing of interactive service calls. For example, the ISCP 40 will store data regarding VIP's and subscribers to identify those subscribers entitled to access each VIP. If this data is related to the particular VIP, the data would list all subscribers permitted access, e.g., those who subscribe to that VIP's services and who are current in their payment of bills. If the data is related to the particular subscriber, the data might indicate that a PIN number functionality is to be applied to access certain VIP's from that subscriber's DET's.

When a subscriber activates the DET to initiate an outgoing call to an interactive service provider, the DET 217 first initiates signaling communications with the IP 37. In response, the IP 37 transmits back text and/or graphics data through the signaling channel instructing the DET 217 to display a message through the TV 217' to the subscriber. Typically, the displayed message is a menu of providers currently available to this subscriber. However, one or more selections displayed on the menu may relate to interactive session with programs run on the IP itself, as discussed in more detail later.

The VIP selection menu is created from information stored in the IP 37 as a function of which VIP's are currently available to the calling subscriber. In a wide area implementation of the network, having multiple ATM switches, some VIP's may connect to only one of the ATM switches. The available VIP's listed on the menu therefore would be those providing service through a particular ATM switch and associated HDT's to a group of subscribers including the calling subscriber. Alternatively, the IP 37 may store and present a customized list of providers that this subscriber prefers to have available for accessing on a regular basis. With the customized menu option, for example, if there are ten providers available through a particular ATM switch 410, and the customer has opted to see only three available providers on a regular basis, the IP recognizes the customer's DET and transmits a customized menu listing only those three to the customer's DET for display. Typically, the customized menu would include an option to receive and select from the full list of providers offering services through the portion of the network serving the calling subscriber.

The user typically reviews the menu displayed on the TV screen and selects one of the available VIP's. In response, the user's DET 217 transmits a signal identifying the number of the selection from the menu upstream to the level 1 gateway application program or module within the IP 37. The level 1 gateway application program or module within the IP always knows what menu it sent to the particular DET 217. The IP 37 therefore uses the precise menu information and a table of VIP identifier codes to translate the selection input signal from the DET 217 into an actual 4-digit VIP identification address for the level 2 gateway of the particular VIP that the person selected.

The IP 37 launches a query to the ISCP 40. The query message identifies the calling subscriber and the selected VIP (by level 2 gateway identifier). The ISCP 40 accesses its data tables to determine if the calling subscriber is currently allowed access to the selected VIP and whether or not a PIN number functionality should be applied to this particular call. The ISCP then formats an appropriate response message based on the information from the relevant data tables and transmits that response message back to the IP 37.

If the data tables in the ISCP 40 mandate a PIN number functionality for this broadband call, the IP 37 transmits a text or graphics message through the downstream signaling channel to the calling subscriber's DET 217. In response, the DET displays a prompting message on the TV 217' asking the current user to input an authorization code. The DET 217 receives input digits from the user and transmits those digits upstream through the network to the IP 37. If the instruction from the ISCP 40 includes the correct value of the PIN number, the IP compares the received digits to the correct value of the PIN number to determine validity of the code input by the current user of the DET 217. If the ISCP stores the PIN number(s) and did not relay the correct value to the IP, the IP responds to the digit input from the user by launching another message to the ISCP 40. This second message contains the input digits, and the ISCP 40 compares the entered digits to valid PIN number(s) stored in its data tables.

If no PIN number was required or the subscriber has entered a PIN and the ISCP or the IP has determined that the user input a valid PIN number, then the IP 37 instructs the PVC controller 420 to establish a broadband virtual circuit between a port of the server of the selected provider 400 and the subscriber's DET 217. The PVC controller 420 accesses its data tables to identify an available permanent virtual circuit between the server and the subscriber's DET 217 for which all necessary elements are currently available. When an available circuit is identified, the PVC controller 420 provides appropriate instructions to the ATM switch 410 and to the HDT 180 to "lock-up" that circuit as a currently active virtual circuit providing broadband communications from the server 403 of the provider 400 to the subscriber's DET 217. Concurrently, a similar procedure is used to establish a two-way active virtual circuit between the DET 217 and the provider's level 2 gateway 401, via the optical fibers 190, the HDT 180 and the X.25 network 220, to carry two-way control signaling messages. In the future, the signaling link will also take the form of ATM cell streams, and the ATM switch 410 will route that information to and from the appropriate provider 400.

Once the communication session is set up, the DET 217 can transmit control signaling upstream through the ONU 210 and the HDT 180. For downstream transmission, the server 403 will provide ATM cells with an appropriate header. The ATM switch 410 will route the cells using the header and transmit those cells over fiber 415 to the HDT serving the requesting subscriber. The HDT 180 will recognize the header as currently assigned to the particular DET 217 and will forward those cells through the downstream fiber of pair 190 and the ONU 210 to that DET, in essentially the same manner as for broadcast programming.

In the implementation of FIGS. 1B and 1C, if one VIP offers a number of different broadband services, e.g., video on demand, home banking, home shopping, the IP may respond to a selection of that VIP by a calling subscriber by supplying the caller with a second menu listing those services. The IP would control the network to set up the signaling communications and broadband communications for an interactive session after the subscriber selected a particular service. If the VIP provides such services via a single level 2 gateway, the IP would identify the selected service to the VIP's level 2 gateway. Alternatively, if the VIP offered multiple services, the IP would route the interactive call to the corresponding level 2 gateway and server. These routing choices would be controlled by data tables stored in the IP or in the ISCP.

As part of the broadband call set up through the ATM switch 410 and the HDT 180, the PVC controller 420 transmits back a confirmation that the broadband connection has been established successfully back to the IP 37. At that point in the call processing routine, the level 1 gateway application program or module within the IP 37 initiates a billing record for the call. As noted above, an interactive broadband session then ensues via the broadband and signaling links. The IP 37 will also receive a notice of an end of a broadband session, e.g., from the level 2 gateway when that gateway and the DET signal each other to terminate communications. At that time, the level 1 gateway application program or module within the IP terminates the usage data record for the call.

For billing purposes, the IP 37 creates a billing record for each channel request or call which resulted in an actual broadband connection through the HDT 180 to a particular subscriber's DET 217. The IP 37 will create such records at least for the broadband connectivity through the ATM switch 410 to the interactive providers 400 and for pay per view type broadcast channel request. The IP 37 may also create similar records for other broadcast services.

Each billing record identifies the VIP providing the particular service. For example, for one of the broadband interactive service providers, the record would identify that VIP's level 2 gateway, by a 4-digit code. The billing record includes an identification of the customer by billing telephone number, an identifier of the particular IP that serviced the call, the connect date, the time that the broadband connection was first established, and the elapsed time until tear-down of the broadband link. The IP supplies all of this information directly through a transmission link to the telephone company's carrier access billing system or "CABS" (not shown) for processing into appropriate invoices for billing the VIP, in a manner substantially similar to billing of an Interexchange Carrier. The usage data can be downloaded periodically to the CABS, or the IP may initiate downloading in response to a manual request from the system administrator. The IP and CABS (Carrier Access Billing System) systems may also accumulate data and bill the VIP's for the X.25 signaling links between the DET's and the VIP's level 2 gateways, but in the currently preferred implementation there would not be any separate charges for the X.25 signaling communications.

The IP therefore collects usage statistics for billing purposes, and the CABS system generates bills for each VIP based on that network usage data. Each VIP establishes its own rates and procedures for actually billing the end users. In the CABS type billing implementation, the subscriber may be charged a flat monthly charge, e.g., on the subscriber's telephone bill, for video dial tone service and/or basic broadcast service. The usage sensitive charges for the broadband connections through the network, however, go to the VIP's; and the VIP's generate their own bills for the interactive services they provide to their customers.

As an alternative, the IP 37 can download the broadband usage information to a customer record information system or "CRIS" (not shown). CRIS would store information as to each VIP's charges and would process that information together with the usage data to generate a combined bill for the end user/subscriber. The subscriber would pay the billed amount to the network operations company, typically the local telephone company, and the network operations company would divide the received revenues between itself and the VIP(s).

Preferred embodiments will use combinations of both CABS type billing and CRIS type billing for different services offered by different providers through the integrated network. For example, one provider 400 offering only interactive type broadband services would be billed through CABS for the broadband connect time. For pay-per-view broadcast services offered by another provider, however, the IP 37 would download the relevant data to the CRIS system to generate a combined bill for connect time and pay per view event purchases.

The network illustrated in FIG. 1C will also provide narrowband transport for voice and narrowband data services. The end office SSP switch 17 provides standard type plain old telephone service (POTS). A digital POTS type switch 17 provides a DS-1 type digital input/output port through interfaces conforming to either TR008 or TR303. Alternatively, the output may go to a digital cross-connect switch (not shown) for routing to the various HDT's or directly to a multiplexer (MUX) 325 serving a particular HDT 180.

The MUX 325 serves to multiplex a number of DS-1; signals for transmission over one fiber of an optical fiber pair 335 to the HDT 180 and to demultiplex signals received over the other fiber of the pair 335. The fiber pairs between the HDT 180 and the ONU's 210 will also have a number of DS-1 channels to carry telephone and narrowband data signals to and from the subscriber's premises. The subscribers' drops 215 include both a coaxial cable and one or more twisted wire pairs. In addition to the video services discussed above, the ONU will provide telephone signals and appropriate power to the subscribers' premises over the twisted wire pairs connected to subscribers' telephone sets 219. Calls going to and from telephone stations shown in FIG. 1C are processed by the SSP's, IP and ISCP in precisely the manner discussed above with regard to FIG. 1B.

Figure 3:
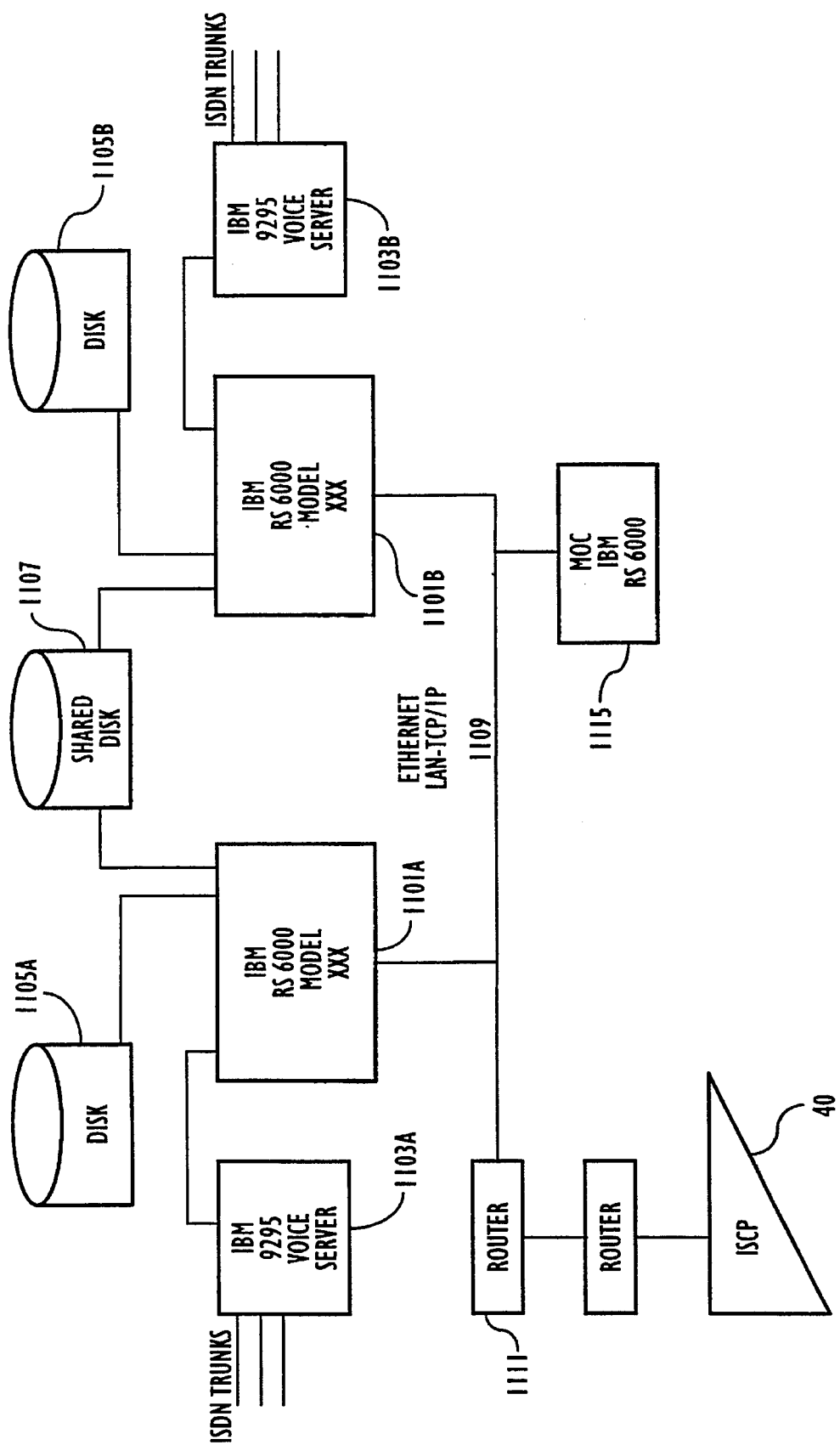
FIG. 3 is a schematic block diagram of one embodiment of an intelligent peripheral for use in the present invention.

FIG. 3 illustrates a first, preferred embodiment of the IP used in the network of FIGS. 1A, 1B, and 1C. In this implementation, the IP will consist of two or more general purpose computers 1101A, 1101B, such as IBM RS-6000's. Each general purpose computer will include a digital voice processing card for sending and receiving speech and other audio frequency signals, such as an IBM D-talk 600. Each voice processing card will connect to a voice server card 1103A or 1103B which provides the actual interface to T1 or primary rate interface ISDN trunks to the SSP type switching office. The plurality of computers may have associated dedicated disk storage 1105A, 1105B, and the IP will included a shared disk memory 107.

Each computer will also include an interface card for providing two-way communications over an internal data communications system, an Ethernet type local area network 1109. The Ethernet carries communications between the individual computers and between the computers and a router which provides an interconnection to the second signaling communications network going to the ISCP. A router 1111 connected to local area network 1109 provides a two-way coupling of the IP to the second data network, for example an Ethernet (IEEE 802.3) type local area network, a token ring, or a mixture of token ring and local area network, etc., at least for communications to and from the ISCP 40. If the X.25 network 220 serves as the signaling network between the ISCP and the IP's, then only one such router connected to that network would be included within the IP. Alternatively, the communications to and from the ISCP may transit a network separate from the X.25 network 220 used for control signaling relating to the broadband services. In such a case, the IP would include the router 1109 connected to the second signaling network, i.e., the data network going to the ISCP, as well as a separate additional router (not shown) for coupling the IP to the X.25 network 220 (or to the ATM switch 410 if signaling is moved to that switch to eliminate the X.25 network 220).

The IP may also include another general purpose computer 1115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup (not shown).

Each general purpose computer 1101A, 1101B will run a node manager, an IP/ISCP Interface program, appropriate voice processing and voice recognition/authentication software and a variety of application software modules to offer the proposed services of the IP. The central administrator or "Node Manager" program module, running on each computer, will monitor and control the various IP resources and operations. One of the software application modules will be a level 1 gateway functionality program, similar to the programming described in commonly assigned U.S. patent application Ser. No. 08/304,174 filed on Sep. 12, 1994 entitled "LEVEL 1 GATEWAY FOR VIDEO DIAL TONE NETWORKS" (attorney docket number 680-093).

The digital voice processing card and associated software will provide speech synthesis, speech recognition capabilities and DTMF tone signal reception, for use in a number of different applications. The speech synthesis and DTMF tone signal reception, for example, will replace the announcement and digit collection functions of the SSP switches in various existing AIN services. These functions can also be used to permit subscribers to input parameters relating to their broadband services and/or to provide a telephony based interface to the broadband services provider's equipment. The general purpose computers and associated circuits will also run a variety of other types of service program modules, for example, a voice mail server module and/or a fax mail server module.

Figure 4:
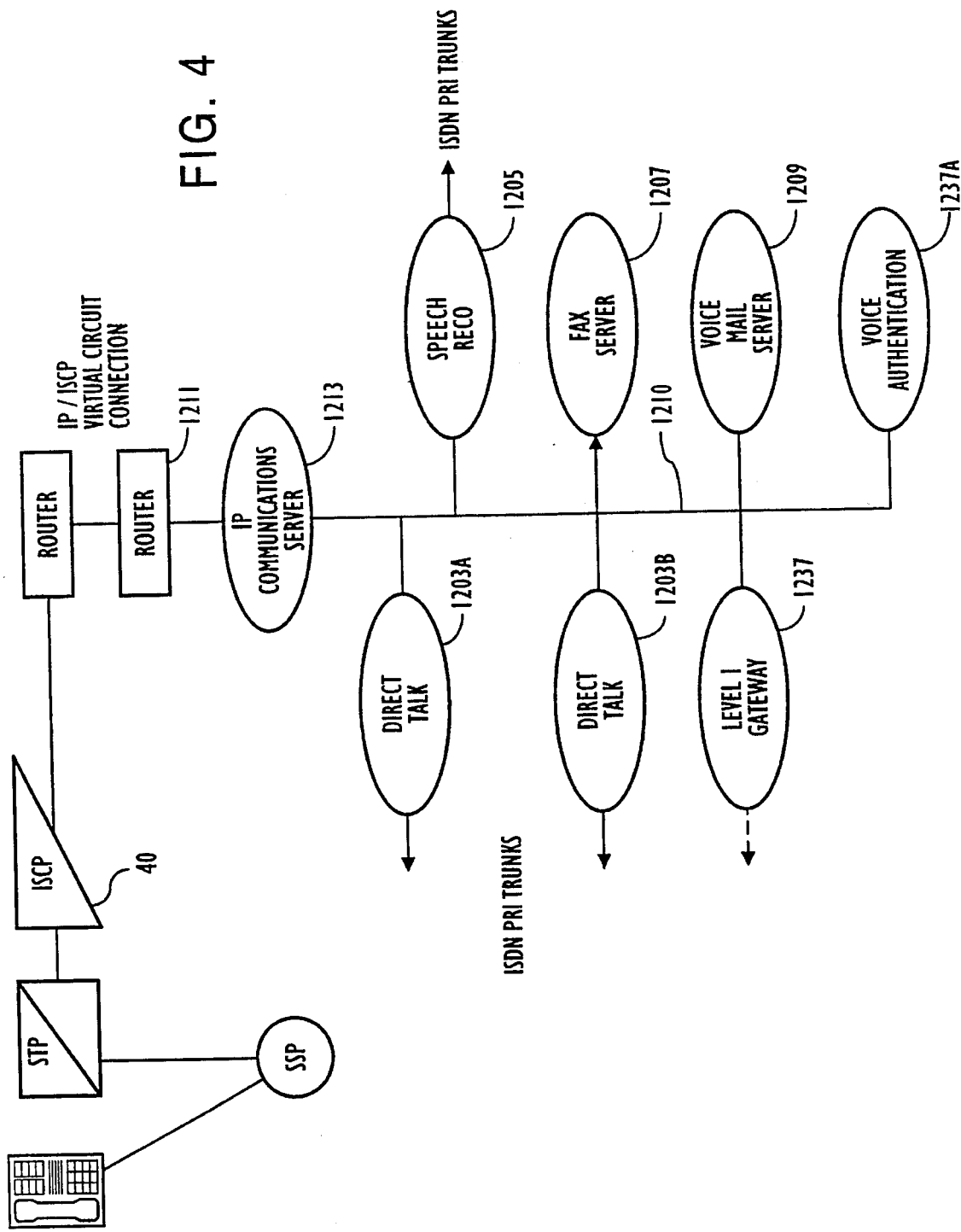
FIG. 4 is a schematic block diagram of an alternate embodiment of an intelligent peripheral for use in the present invention.

FIG. 4 illustrates an alternate embodiment of the IP used in the network of FIG. 3. The alternate architecture utilizes separate modules for different types of services or functions, for example, one or two Direct Talk type voice server modules 1203A, 1203B for interfacing the trunk to the SSP, a separate module 1205 for speech recognition, a server module 1209 for voice mail, and another server 1207 for fax mail services, a level 1 gateway module 1237 for controlling broadband services, a speech authentication module 1237A, etc. The various modules communicate with one another via an internal data communication system 1210, which again may be an Ethernet type local area network.

The Direct Talk modules 1203A, 1203B provide voice message transmission and dialed digit collection capabilities, as in the earlier embodiment. The modules 203A, 203B also provide line interfaces for communications to and from those servers which do not incorporate line interfaces. For example, for facsimile mail, the Direct Talk module connected to a call would demodulate incoming data and convert the data to a digital format compatible with the internal data communication network 1210. The data would then be transferred over network 1210 to the fax server 1207. For outgoing facsimile transmission, the server 1207 would transfer the data to one of the Direct Talk modules over the network 1210. The Direct Talk module would reformat and/or modulate the data as appropriate for transmission over the ISDN link to the SSP. The Direct Talk modules provide a similar interface function for the other servers, such as the voice mail server 1209.

The illustrated IP also includes a communication server 1213. The communication server 1213 connects between the data communication system 1210 and the router 1211 which provides communications access to the second signaling communication system and the ISCP 40 and other IP's which connect to that signaling communication system. The communication server 1213 controls communications between the modules within the IP and the second signaling communication system. Again, if the X.25 network 220 serves as the signaling network between the ISCP and the IP's, then only one router 1211 and the communication server 1213 are included within the IP. Alternatively, the communications to and from the ISCP may transit a network separate from the X.25 network 220 used for control signaling relating to the broadband services. In such a case, the IP would include the communication server 1213 and router the 1211 connected to the second network going to the ISCP, and the level 1 gateway module 1237 would include a separate additional router (not shown). This additional router would provide a two-way data coupling to the X.25 network 220 (or to the ATM switch 410 if signaling is moved to that switch to eliminate the X.25 network 220) as represented by the dotted line arrow from the gateway module 1237 in FIG. 4.

In each of the proposed architectures, the SSP switch would route voice grade telephone calls to the different elements of the IP in response to instructions from the ISCP. In the initial implementation using general purpose computers (FIG. 3), each of which offers all service functionalities, the decision to route to a particular one of the computers would be a resource availability/allocation decision. If necessary, data can be exchanged between the computers via the internal data communications network, e.g., if a message for a particular subscriber's service is stored in the disk memory associated with one computer but the other computer is actually processing the call. In the second implementation (FIG. 4), however, the ISCP would instruct the SSP to route the call to the particular line to the specific module capable of providing a calling customer's individual service. For example, if the subscriber has some form of speech recognition service, the call would be routed to the speech recognition module 1205. For voice authentication, the call would be routed to module 1237A. If the subscriber has a voice mail service, however, the ISCP would instruct the SSP to route the call to one of the lines going to one of the voice server modules 1203A, 1203B. The module 1203A, or 1203B would receive outgoing voice messages from the voice mail server 1209 for transmission to the caller. The module 1203A or 1203B would decode DTMF signals and supply appropriate data to the voice mail server for control purposes. The module 1203A or 1203B would also format incoming voice messages for transmission over internal network 210 and storage by server 1209.

For broadband services, the HDT's 180 would provide appropriate signals to the IP 37, and the signals would be internally routed to the appropriate module within the IP. For example, assuming use of the X.25 signaling network 220 both for signaling from the HDT's and to/from the ISCP, in the FIG. 3 embodiment, signals to the level 1 gateway application program would come in through the router 1111 and go to whichever processor 1101A, 1101B was currently able to handle broadband service functions at that time. The available processor 1101A or 1101B would process the signals from the HDT 180, access the ISCP 40 as needed, and transmit back instructions through the internal Ethernet 1109, the router 1111 and the X.25 signaling network 220. In the embodiment of FIG. 4, signals from an HDT would come in through the router 1211, and the communication server 1213 would route those signals through the internal Ethernet 1210 to the level 1 gateway module 1237. The level 1 gateway module 1237 would process the signals from the HDT 180, access the ISCP 40 as needed, and transmit back instructions through the internal Ethernet 1210, the communication server 1213, the router 1213, and the X.25 signaling network 220.

Using a proprietary protocol +1129 developed for this project, the IP will query ISCP in response to a voice grade call or a broadband service request. For example, during a voice telephone call, a trigger event occurs. The SSP queries the ISCP which responds by instructing the SSP to route the call to the IP, using standard TCAP protocol messages. Using the +1129 protocol, when the SSP routes the call to the IP, then the IP queries the ISCP and receives one or a sequence of instructions as to how to process the particular call. The message set defined by this protocol is as follows:

ProvideInstructions—message sent by the IP to ask ISCP software for information on handling a call. Begins a transaction and provides necessary information to start the appropriate MSAP script.

CallInfoToResource—sent by ISCP software to the IP to inform it to play messages to the caller and/or collect and return digits entered by the caller. May inform the IP to terminate the call.

CallInfoFromResource—message sent by the IP in response to the preceding CallInfoToResource message. Includes result code and collected digits.

SwitchInfoToResource—message sent by ISCP software to provide the IP with the information it needs to transfer the call elsewhere. This message and the following one are not part of TA-NWT-001129.

SwitchInfoFromResource—message sent by the IP or ISCP software with the result of the preceding SwitchInfoToResource.

ResourceClear—message may be sent by the IP in response to a preceding CallInfoToResource if that preceding message requested that the call be terminated. Also, may be sent by the IP asynchronously to alert ISCP software that the call was terminated by the customer. This message includes a parameter describing the "cause" for terminating the call.

CancelResourceEvent—message sent asynchronously by ISCP software to terminate the conversation. Implies abnormal termination. Normally CallInfoToResource is used to terminate a call.

ExtendedInfoToResource—message sent by ISCP software to the IP to provide a standard format for extending the message set above. In this specification, it is used to extend the message set to include the Play Application with information message.

ExtendedFromToResource—message sent by the IP to ISCP software in response to the ExtendedInfoToResource message above. A modified protocol specified in Bellcore TA-NWT-001129 includes a similar but somewhat smaller message set which may be used for communications between an ISCP and an SSP as an enhancement over the standard TCAP message set.

As an alternative, or in addition to the +1129 protocol, communications between the IP and the ISCP may utilize generic data interface (GDI). The GDI command set is simpler and more generic, and the commands can carry more data. Also, either the ISCP or the IP can initiate communications using GDI. This permits a wider variety of routing and processing routines. Again, using a voice telephone call as an example, in response to a triggering event, the SSP would again receive instructions to route a call in progress to the IP. However, rather than waiting for a subsequent query from the IP, while the SSP is routing the call the ISCP could instruct the IP to prepare to receive a call on a particular circuit. For example, for a call which might require speech recognition processing, the ISCP would instruct the IP to retrieve appropriate recognition templates from memory. For a call needing speech authentication, the ISCP would instruct the IP to retrieve appropriate individualized authorization templates from memory.

As outlined briefly above, the IP 37 performs a variety of functions on AIN type voice grade calls, in addition to the control functions relating to the broadband services.

Figure 5:
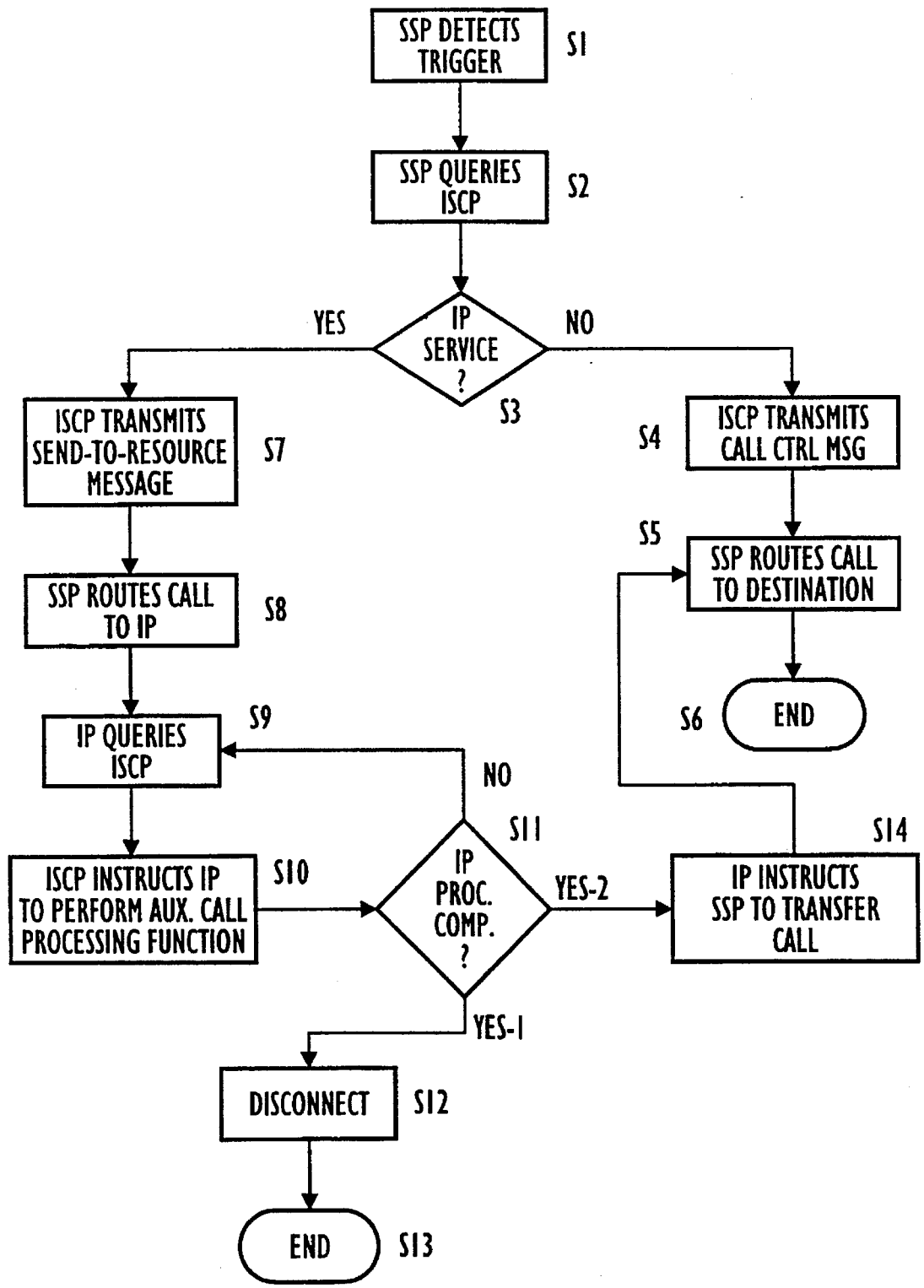
FIG. 5 is a simplified flow chart diagramming a first mode of voice grade call processing by an advanced intelligent network, utilizing one or more peripheral platforms, in accord with the present invention.

The flow chart of FIG. 5 depicts a first mode of voice grade call processing in accord with the present invention, wherein an AIN type query and response communication procedure between the SSP and the ISCP is used to route appropriate calls to the IP. As noted above, voice telephone calls requiring some form of AIN service processing will include an event detectable as a trigger. This might be an off-hook on a line for a subscriber to a speech recognition dialing service. As another example, for a call-block service on calls to a particular subscriber, the triggering event would be the dialing of that subscriber's telephone number. This later type of trigger may take the form of a dialed number trigger set in the SSP servicing the caller, or this trigger may be set as a destination number trigger in the SSP serving the called subscriber. A variety of other triggers are known, and a particular trigger is set up in the SSP(s) as needed to effectuate each particular AIN service. For simplicity, the processing illustrated in FIG. 5 begins at some point during call processing when an SSP detects some event identified as a trigger (S1).

In response to trigger detection, the SSP queries the ISCP for further instructions (S2). More specifically, the SSP type central office (CO) suspends the call and sends a query message to the ISCP via one or more STP's (see FIG. 1B or FIG. 1C). This query message is in the above described TCAP format for an initial query from an SSP. The query message includes a substantial amount of relevant information, such as the dialed digits and the identification of the telephone line from which the party originated the present call. The originating SSP sends the TCAP query via a CCIS link to an STP. The STP recognizes that the TCAP query is addressed to the ISCP and retransmits the query, either directly or through a further STP, and the SS7 links to the ISCP.

The ISCP 40 uses information contained in the TCAP query message to access data tables stored in the SCP database 43. The ISCP uses data from the retrieved tables to translate the information from the TCAP query into an appropriate instruction for the SSP. At this point, the instruction will take a different form depending on whether or not the relevant AIN service requires some processing feature provided by the IP. If the service does not call for an IP feature, processing branches from step S3 to step S4, wherein the ISCP transmits a call control message to the SSP via the STP's of the SS7 signaling network. In the simplified example here, it is assumed that the non-IP type service involves only a direct routing to a destination, without any further processing by the SSP. The message from the ISCP, in TCAP format, therefore specifies an actual destination number and provides any necessary associated routing instructions, such as a preferred trunk group identification, from the data tables. At step S5, the SSP executes normal call processing routines for completing the call using the destination telephone number and/or routing information received from the ISCP, and call processing ends at step S6.

Returning to step S3, if the service identified in response to the information in the original TCAP query message requires one or more call processing functions of the IP, processing branches to step S7. At this point, the ISCP transmits a "SENDTORESOURCES" type TCAP message or a similar message from the +1129 protocol back to the SSP via the STP's of the SS7 signaling network. This message would include sufficient information to route the call to one of the lines going to a voice server interface 103A or 103B within the IP. If the IP connects directly to the SSP, the SSP simply activates appropriate internal switching elements to establish the call connection channel between the caller and the IP. If the IP does not connect to the particular SSP, the instruction will provide sufficient information to route the call through other switching systems to the IP.

When the IP receives the call, the SSP will provide the IP with a substantial amount of information about the particular call, including the dialed digits and the calling party's telephone number. In response to the call, the IP will formulate a query message containing this information. The IP will transmit this query message to the ISCP via the second signaling communication network (S9). The ISCP will utilize the information from the IP query message to access the stored data tables in the SCP database 43, formulate an appropriate instruction, and transmit that instruction back to the IP via the second signaling communication network. For example, in a call blocking type service requiring a caller to input a PIN number in order to reach a called subscriber, the instruction might identify a prompting message and specify a number of digits to be collected. The IP would receive the message and perform the call processing function specified in the instruction (S10). In the present embodiment of the invention, the instruction would direct the IP to select the template corresponding to the calling user, have the user speak the word represented by the template, make the comparison, and signal a match or no-match. In the case of a match, the IP would be instructed to complete the transaction and store the pertinent record data.

At this point processing by the IP may be complete, or further interaction with the ISCP may be necessary to determine how to dispose of the call. A branch therefore appears in the call processing at step S11. If further processing is necessary, the IP will again communicate with the ISCP by transmitting a message, which may be another query, up to the ISCP through the second signaling communication network (S9).

In the present call blocking example, the IP function in step S10 would involve retrieval of the identified message from memory and provision of that message to the digital voice card. The digital voice card would synthesize appropriate speech signals for transmission through the voice server card 103A or 103B and the voice network to the caller. This voice message might say "Jane Smith does not wish to be disturbed at this time. If you wish to leave a message please stay on the line." Callers familiar with Ms. Smith would know that this blocking feature could be overridden by input of a personal identification number (PIN) which Ms. Smith had given them. The IP would wait a specified time period and would collect any dialed digits received from the caller during that period. At step S11, processing would not be complete and would branch to step S9. The IP would formulate a query or other format message including any dialed digits received or information indicating a lack of receipt of digits and transmit that data message back up to the ISCP through the second signaling communication system.

The ISCP 40 will utilize the information from the latest IP query message to again access the stored data tables in the SCP database 43, formulate an appropriate instruction for further processing and transmit that instruction back to the IP via the second signaling communication network. The loop formed by steps S9 to S11 will continue in this manner until IP processing is complete. Continuing with the call blocking example, the ISCP would identify whether or not a correct PIN was dialed in by the caller. If not, the next message to the IP would instruct the IP to execute a voice mail box script for the called subscriber. The IP would play an outgoing message and record an incoming message to the caller. After completion of the mailbox script, IP processing would be complete. At step S11, process flow would branch to the "Yes-1" alternative, and the IP would disconnect the call (S12) and processing would end (S13).

Not all processing of AIN telephone calls by the IP ends in a simple disconnect. Other alternative call dispositions are possible. The most common, illustrated in FIG. 5, is that after all other processing the IP will instruct the SSP to transfer the call to a specified destination (S14). In such a case, the message transmitted from the ISCP to the IP as part of step S10 would specify an actual destination number. In the call blocking example, if the ISCP determined that the caller had dialed in a valid PIN, the ISCP would transmit the telephone number for Jane Smith's current location. When processing branches to step S14, the IP will request call transfer by the SSP and supply the destination number to the SSP. For example, if the link to the SSP uses ISDN, the IP would transmit a transfer request and the destination digits over the D-channel. As an alternate example, if the link is T1 carrying multiplexed Centrex lines, the IP would simulate a hook-flash on the line or channel carrying the call and then outpulse the digits of the destination number.

In response to the transfer request, the SSP routes the call to the destination (S5) and tears down the prior call connection between the caller and the IP. Call processing again ends at step S6.

Figure 6:
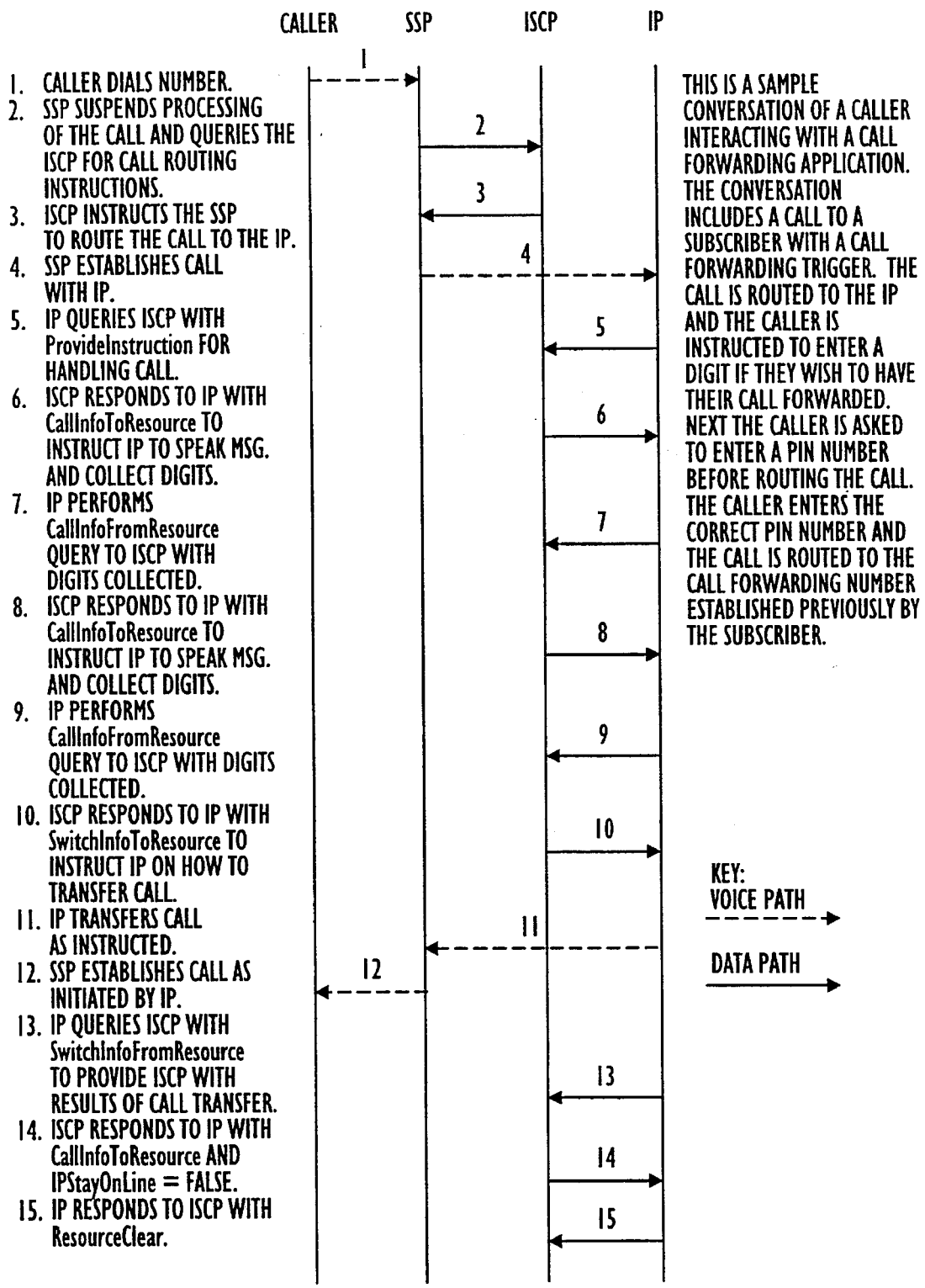
FIG. 6 illustrates in more detail the exchange of messages between network elements and operations performed, in an exemplary telephone call forwarding service.

FIG. 6 illustrates in more detail the exchange of messages between network elements and operations performed, in an exemplary call forwarding service with a PIN number screening feature utilizing the method of operation of FIG. 5. The illustrated example uses specific messages from the +1129 protocol.

Figure 7:
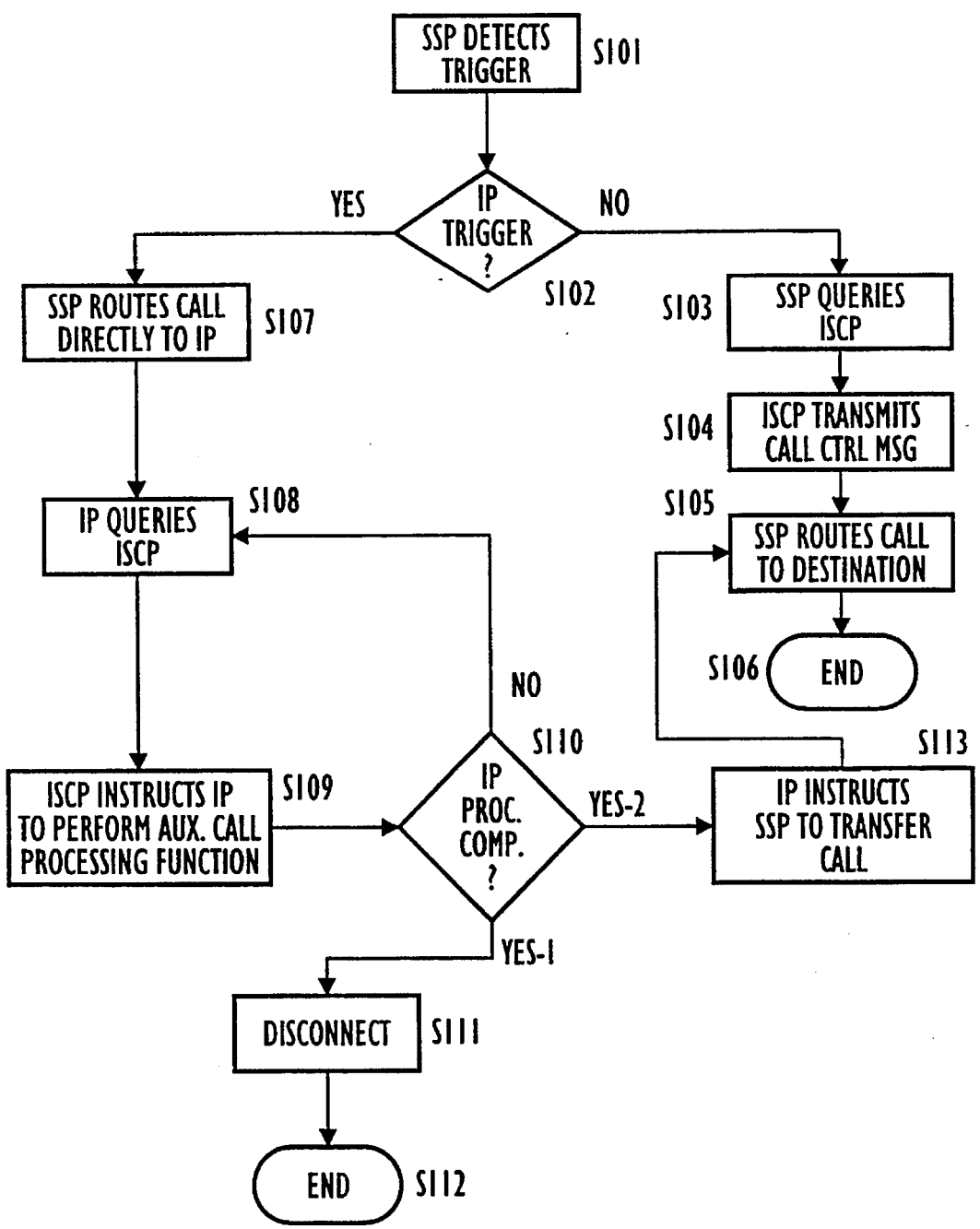
FIG. 7 is a simplified flow chart diagramming a second mode of voice grade call processing by an advanced intelligent network, utilizing one or more peripheral platforms, in accord with the present invention.

The flow chart of FIG. 7 depicts a second mode of voice grade call processing in accord with the present invention. As in the earlier method of operation, the relevant portion of the call processing begins when the SSP detects some call related event as a trigger (S101). In this second embodiment, however, not all triggering events trigger communication with the ISCP. Some triggering events activate direct routing to the IP. More specifically, the SSP will still recognize triggers for initiating communication with the ISCP in the normal manner. In addition, the translation tables stored in disk memory 63 within the administrative module 55 will provide data, such that in response to certain triggers, the SSP can establish a call communication connection between the caller and the IP, without first querying the ISCP. Thus, in FIG. 7, step S102 illustrates a branching in the process flow based on whether or not the trigger indicates need for routing to the IP. If the trigger is not an IP trigger, call processing branches to step S103, wherein the SSP transmits a TCAP query to the ISCP. In response, the ISCP accesses the data tables in the SCP database 43 and formulates an appropriate response message for transmission back to the SSP. In the illustrated example (S104) the message is a call control message, in TCAP format, specifying a destination telephone number and additional routing information as needed. The SSP uses the routing information and destination number to route the call through the network in essentially the manner discussed above (S105), and the call processing ends at step S106.

The example of call processing shown in steps S103 to S106 assumes, for simplicity, that the service involves only direct routing to a destination. A wide variety of other AIN services, with more complicated call processing routines and multiple communications between the SSP and the ISCP could be used here to provide subscribers a wide array of services. Also, some of the AIN services which start in response to a non-IP trigger may still require some IP features under certain circumstances. If IP services become necessary, one of the ISCP instructions to the SSP would result in routing to the IP and further processing similar to that discussed above with regard to FIG. 5.

Returning to step S102 in FIG. 7, if at that point the triggering event corresponds to an IP service, call processing branches to step S107. In that step, the SSP uses the information retrieved from its internal translation tables to route the call to an IP. The IP may be directly connected to the SSP, or the SSP may route the call through one or more switching systems to reach the IP. The IP utilizes call related data received from the SSP to formulate an initial query and transmits that query to the ISCP through the second signaling communication network (S108). The ISCP will utilize the information from the initial IP query message to access the stored data tables in the SCP database 43, formulate an appropriate instruction and transmit that instruction back to the IP via the second signaling communication network. The IP receives the message and performs the call processing function specified in the instruction from the ISCP (S109). If further processing is needed (S110), processing flows back to step S108 for a further transmission to the ISCP. The steps S108, S109, and S110 form a processing loop for successive interactions between the IP and the ISCP to control the IP to perform a series of service features or operations in accord with data from the tables stored in the SCP database. This loop operates in essentially the same manner as the loop formed by steps S9, S10, and S11 of FIG. 5.

The loop processing will continue until no further processing by the IP is required. Several different types of call processing may follow completion of the IP operations, two of which are illustrated in the drawing. One outcome, when no further processing of the call at all is necessary, for example, at the end of a facsimile mail transmission, results in a disconnect (S111), and processing ends at step S112. Other types of services, such as access to a restricted class of service following entry of a valid PIN, result in further routing of the call. In such cases, the IP will instruct the SSP to transfer the call to a destination specified in one of the instructions from the ISCP (S113) and may provide additional routing control instructions, in one of the manners discussed above. In response to the transfer request, the SSP routes the call to the destination (S105) and tears down the prior call connection between the caller and the IP. Call processing again ends at step S106.

Typically, a single IP will service up to five or six SSP type switching offices. The second signaling communication network will permit exchanges of data between IP's. For example, in voice mail or fax mail applications, messages from a subscriber's mailbox in a home IP can be transferred via the second signaling network to a remote IP serving an area from which a roaming subscriber calls in. This eliminates the need for a voice trunk connection between the subscriber's current location and the subscriber's home IP to permit the subscriber to retrieve messages while away from home. The subscriber would only need to make a local call to the IP serving the area the subscriber is calling from.

One major use for the peripheral platform, in each implementation, relates to provisioning and/or modifying voice grade telephone services and broadband services. The peripheral platform would provide voice prompts and receive DTMF or speech inputs from subscribers and store service control data and personalized messages, for subsequent use in providing the subscribers' individualized services, as discussed in more detail below. The IP will also provide prompts and receive data inputs via the DET 217 and the associated TV 217'.

Typically, a subscriber's services are initially set up by a telephone company technician using the Service Creation Environment or SCE 42 in the ISCP 40. As part of this procedure, the technician establishes one or more data tables for the subscriber in the SCP 43. The format of the data tables would be defined by the types of data needed to control the service in the manner selected by the particular subscriber. Any control data which the subscriber wants to apply as fixed data to all voice grade telephone calls would also be input by the technician using the SCE 42. Subsequently, the subscriber would actually control the telephone service by inputting data to populate the subscriber's data table(s) through an interaction with the peripheral platform. The newly input control data is transferred from the peripheral platform to the ISCP for storage. If the particular service requires a stored voice message, such as a personalized greeting, that message would be stored in the peripheral platform. Similar procedures may be used to establish and populate appropriate data files for broadband services.

One specific implementation for receiving inputs from the subscriber uses an interactive voice and DTMF input type access procedure. The subscriber would dial a specified number to initiate programming, for example a seven digit number, such as 550-0211. The call could be routed through the network to a line connected to the peripheral announcement platform or the IP, in one of the ways discussed above with regard to FIGS. 5 and 7. The particular peripheral platform would provide synthesized speech prompts and accept DTMF inputs, in response to instructions from the ISCP, to allow the subscriber to enter the service data, such as a new forwarding number or a new PIN number. The subscriber might also be prompted to record a greeting, if appropriate.

Using the +1129 protocol for communications between the IP and the ISCP, the IP would query the ISCP, and the ISCP would return an instruction for each operation to be performed by the IP. For example, the IP would send a query, the ISCP would instruct the IP to play a specified prompt message and collect digits, e.g., for a new PIN number. The IP would play the message, collect the digits and return the digits to the ISCP. If further input was necessary, the ISCP would return another message requesting input of additional information, e.g., to confirm the input PIN number. This routine would continue until processing by the IP was complete.

Using the more generic form of communications between the IP and the ISCP, the ISCP might initiate the communications and larger quantities of data can be exchanged with each message. This capability might be used to instruct the IP to play a specific detailed script type application, e.g., for input of a long series of data inputs and/or associated personalized messages to set up and more complex service. Assume for example, that the script called for an Interactive Voice Response (IVR) routine to input one or PIN numbers, an initial greeting for use as a prompt to request PIN number input and a second message for playback when a caller fails to input the correct PIN. The IP would store a script for conducting a customized interactive input procedure for each particular subscriber, in the example for prompting and receiving the PIN digits and messages. When the subscriber dials the specified number to initiate programming, the call is routed through the network to the IP in the usual manner. Concurrently, the ISCP sends an initial message informing the IP of the incoming call and the need to retrieve the data necessary to play the particular service modification script. The IP unit would provide customized synthesized speech prompts and accept DTMF inputs to execute an authorization procedure and then allow the authorized subscriber to selectively enter one or more new PIN numbers, and store new voice messages. The IP might also use its synthesized speech messaging facilities to provide confirmation messages repeating back the received data and requesting dialing of a confirmation code, such as depression of the "#" key.

Through either of the above discussed interactive procedures, the IP will collect all necessary information from the subscriber, after which the subscriber hangs up. The IP will then transfer data, as necessary to the ISCP, for example the newly input PIN number, through the second signaling network. The ISCP will verify received data inputs from the subscriber to insure that they meet the requirements for controlling the particular subscriber's call processing routine and/or broadband services, and if the inputs are valid, the ISCP stores the received data in the subscriber's files. If errors are found, for example if the caller entered only seven digits at a point where eight were expected, the ISCP could provide an error message, and the peripheral platform would prompt again for input of the relevant data.

Use of the IP may also offer several alternatives for receiving subscriber inputs and transferring input data for storage in the SCP database 43. Different subscribers may access the system using different means, and/or one subscriber may access the database one way one time and a different way at other times. For example, instead of using DTMF dialed digit inputs, the speech recognition software in the IP might permit the caller to speak in input data, such as numbers for call redirection. Because the IP can interact with the DET 217, the subscriber can also use the remote control, the DET and the associated TV to receive visual menus and prompts and provide data inputs to manipulate the subscriber's AIN based telephone services. The IP might also be programmed to send and receive data through the telephone network, and thereby permit subscribers to access the system from a screen based telephone and/or a modem and personal computer arrangement.

The IP also provides a video information user (VIU) access to control certain parameters of the user's video dial tone service. Typically, the initial VIP selection menu presented to the subscriber includes one or more options or choices for interacting with the IP to change any such service parameters. With this feature, the subscriber would initiate communications from the DET 217 to the IP 37 in precisely the same manner as for a broadband interactive call to a video information provider (VIP), but part of the VIP selection menu displayed to the caller offers one or more interactive network choices, such as "Personal Options," "Service Activation," or "Subscription Management". Selection of any one of these choices from the menu (instead of one of the VIP's) initiates an interactive session between the subscriber and a corresponding software application running on the IP 37. In the network of FIG. 1C, the communications for this session will be entirely through the signaling channel. The DET 217 transmits upstream signals through the signaling link and the X.25 data call to the IP 37, and the IP 37 transmits text or graphics displays and instructions to the DET 217 back downstream through that signaling path.

A "Personal Options" session with the level 1 gateway would step the subscriber through a series of menus and inputs to select an option to modify (e.g., PIN number or customize menu) and collect the information from the subscriber needed to execute that option. For example, if the subscriber selected the PIN number option, the IP would transmit a prompt screen asking for a four digit PIN. The user would operate the remote control to input a four digit number, and the DET 217 would transmit that number up to the IP 37. The IP 37 would then transmit a prompt screen asking which VIP's on the menu the subscriber wanted that PIN applied to, and the DET 217 would relay appropriate subscriber inputs upstream to the IP 37. After completion of such a procedure, the IP would compile one or more messages and transmit those messages to the ISCP to update the subscriber's records in the ISCP 40 to define and/or modify the PIN number feature applied to interactive broadband session requests from that subscriber's line. The present invention can apply a single PIN for all VIP's a subscriber chooses to restrict access to, as in the example described in detail above. Alternatively, the IP 37 could offer to apply different PIN numbers to different VIP's. As noted above, the "Personal Options" which the IP 27 will permit a subscriber to customize include PIN number and menu customization, but this feature can be applied to other options, some of which relate to broadband services through the network as well as to telephone services.

The Service Activation function permits the user to specify various levels of broadcast service that are to be provided to the subscriber through the subscriber's DET's. The Subscription Management function is similar and related to the service activation function. The subscription management application provides an automated means for the user to alter the user's profile and subscription information stored in the IP 37. For example, this application can be used to change scrambling, encryption, or interdiction status of a broadcast channel for the user. As another example, through the subscription management function the IP would interact with the subscriber to add service for a new DET at the subscriber's premises.

The IP 37 performs DTMF digit collection and voice announcement functions on telephone calls for a wide variety of telephone services available through the network. These features also permit a subscriber to call in and access the above described interactive features relating to the subscriber's broadband services. Thus, if the subscriber chose to call in on the telephone D, instead of using the DET 217, the IP would provide voice prompts and collect digits to perform a "Personal Options," "Service Activation," or "Subscription Management" interactive session with the subscriber. The voice prompt and digit collection for these activities would directly emulate the display and subscriber inputs through the DET for the selected interactive session.

Figure 8:
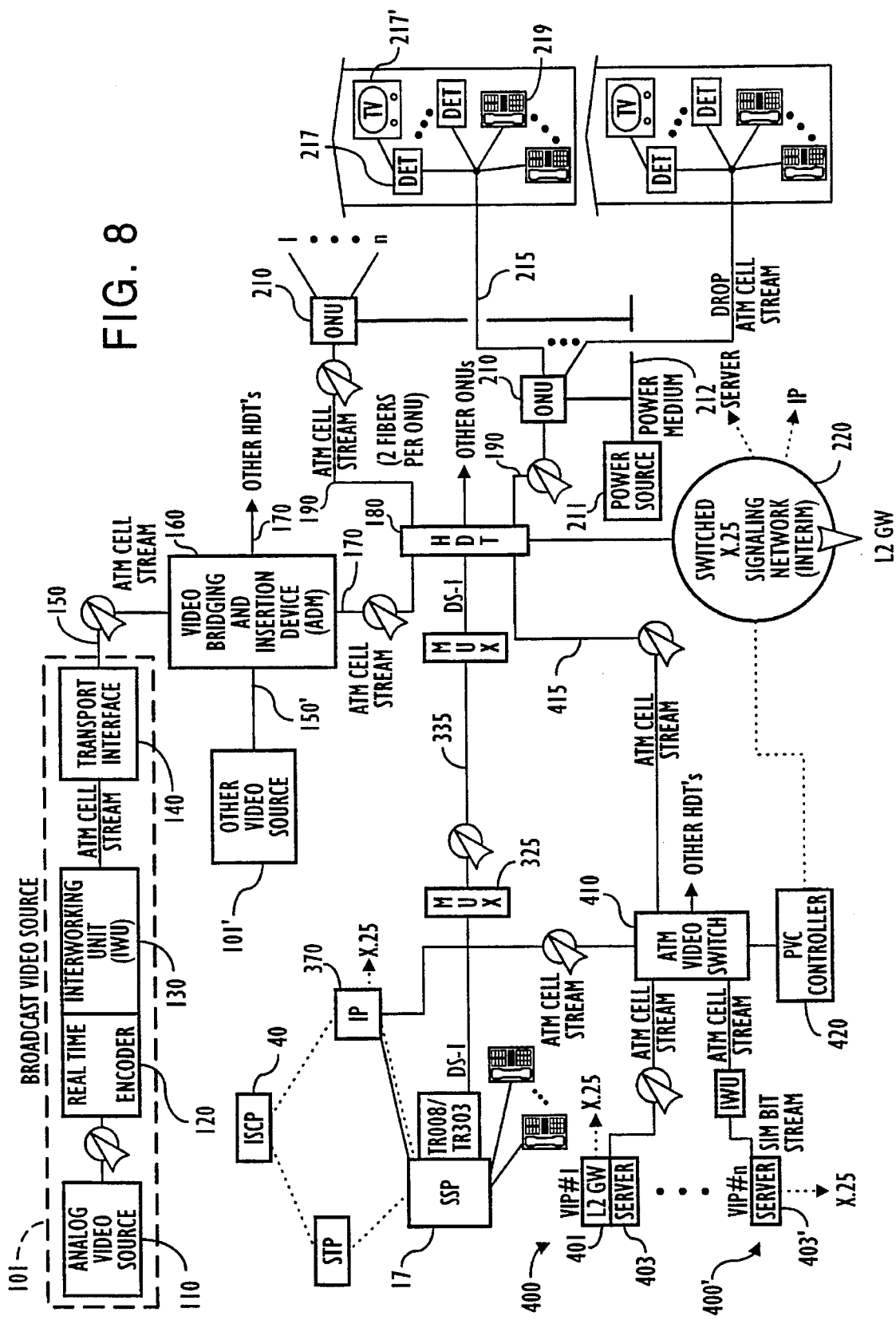
FIG. 8 illustrates a modified broadband network architecture, similar to that shown in FIG. 1B, but with a broadband link to the intelligent peripheral.
Figure 9:
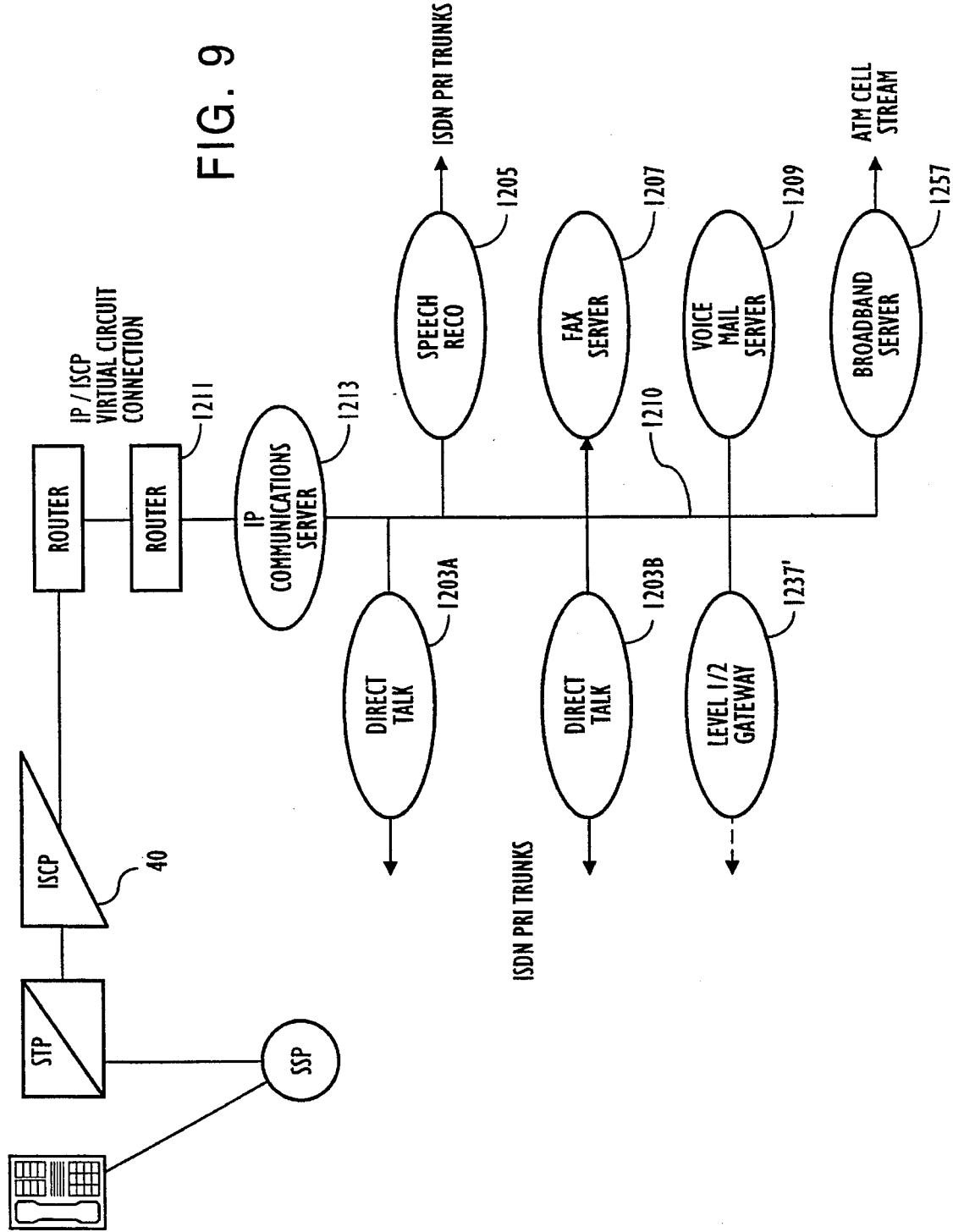
FIG. 9 depicts an alternate embodiment of the intelligent peripheral, including a broadband file server.

FIG. 8 depicts a slightly modified version of the portion of the network illustrated in FIG. 1C, and FIG. 9 shows a modified IP structure similar to FIG. 4. In FIGS. 8 and 9, the same reference numerals as in FIGS. 1C and 4 identify elements having corresponding structure and function to elements shown in FIGS. 1C and 4, respectively. The operation of this network is substantially identical to that of the earlier implementation of the network. As shown in FIG. 8, however, the IP 370 has a broadband output. As shown in FIG. 9, the IP 370 includes a broadband server 1257. The server 1257 is similar to the interactive broadband file server 403 operated by one of the VIP's. The server 1257 outputs an ATM cell stream carrying digitized and compressed audio/video materials. The ATM cell stream output of the server 1257 goes to the ATM switch 410, and the network routes programs carried in that cell stream to individual subscribers DET's 217 in essentially the same manner as for ATM broadband materials from the server 403.

The discussion of the IP control of broadband communications, with respect to FIG. 1B, assumed only data/signaling communications between the IP 37 and the DET's 217. Consequently selection menus, etc., from the IP took the form of text and/or graphics. In the embodiment of FIGS. 8 and 9, however, the IP 370 can transmit still frames of MPEG encoded video information and/or full motion video through the ATM cell stream and broadband routing through the network. This permits the operator of the IP to design much more varied interactive sessions combining text, graphics, still frames, and full motion video for selections through the IP and for interactive sessions with the IP used to input or modify service related information stored in the network (e.g., for "Personal Options," "Service Activation," or "Subscription Management").

If the TELCO operating the network chose to offer video on demand or other broadband interactive services in direct competition with the VIP's, the broadband information for such services would be maintained within the broadband server 1257. In addition to the level 1 gateway functions performed by module 1237, the module 1237' in the FIG. 9 implementation would emulate a level 2 gateway. If the subscriber chose the TELCO's interactive service, the level 1 gateway application would establish a signaling communication session with the level 2 gateway application program in the module and would control the network to establish a broadband communication between the subscriber's DET 217 and the broadband server 1257. The level 2 gateway application would then provide menus and accept selection inputs from the subscriber and control the broadband server 1257 to provide selected broadband information for transmission through the network to the subscriber's DET 217, exactly as if the level 2 gateway and server were operated by an independent VIP.

As noted above, in the implementation of FIGS. 1A, 1B, and 1C, the IP may provide subscribers a second level menu for those VIP's offering a number of different broadband services, e.g., video on demand, home banking, home shopping. In the implementation of FIG. 9, the IP may actually replace the VIP's level 2 gateway for some or all services offered by a particular VIP, if a VIP chose not to provide its own level 2 gateway. The VIP's data for controlling its services would reside in the level ½ gateway module 1237' in the IP. When a subscriber selected a service from such a VIP, the level 1 gateway application in the module 1237' would establish a signaling communication session between the DET 217 and the level 2 gateway application program in the module 1237'. The level 1 gateway application would concurrently control the network to establish a broadband communication session between the subscriber's DET 217 and the broadband server 403' of the chosen VIP. The level 2 gateway application would then provide menus and accept selection inputs from the subscriber in the normal manner, but the level 2 gateway application would transmit control messages, e.g., through the X.25 signaling network 220, to the VIP's server 403'. The server 403' would respond to those control messages by providing selected broadband information for transmission through the network to the subscriber's DET 217 in the normal manner.

The DTMF digit collection and voice announcement functions of the IP 37 can also provide telephone call access to control specific services offered by VIP's through their level 2 gateway and associated server. For example, a VIP could be assigned a telephone number for dial-up access. One or more of the SSP's of the network would recognize dialing of that number through a telephone station as a dialed destination number type AIN trigger. An SSP detecting such a trigger would query the ISCP 40, in the normal manner, and the ISCP 40 would instruct the SSP to route the call to the IP 37. Alternatively, the dialing of the number could trigger direct routing of the call to the IP as in FIG. 7.

The IP 37 would next obtain instructions from the ISCP 40 as to how to process the call. For example, the ISCP 40 could identify the called VIP based on the dialed destination number and instruct the IP 37 to play the VIP's customized initial greeting from storage within the IP and then collect digits. The greeting would welcome the caller to the VIP's services and provide a spoken initial menu of the services offered by the VIP. The IP would then collect digits indicating a selection from the menu and forward those digits to the ISCP for further analysis. If the selected service required a PIN, the ISCP would instruct the IP to prompt for the PIN and collect dialed digits for further processing by the ISCP.

Once the subscriber has selected a service and provided a valid PIN, if necessary, the IP 37 would establish a signaling call with the VIP's level 2 gateway. The level 2 gateway would instruct the IP to play appropriate prompt messages, collect dialed input digits, and forward those digits through the signaling call back to the level 2 gateway to effectuate the necessary interactivity for the service selected by the calling subscriber.

For example, if the VIP provides broadcast pay-per-view services, the subscriber could interact through the IP in this manner to advance order a pay-per-view event from any telephone for at-home viewing through the subscriber's DET and television set. After successful ordering of a particular event, the level 2 gateway would inform the IP of the scheduling of the event and instruct the IP to authorize the subscriber's DET to receive and decode the event at the scheduled time. The IP would then signal the subscriber's DET at the appropriate time, to at least notify the user, and may instruct the DET to turn on and/or tune to the appropriate digital program channel to receive and display the ordered event.

As another example, if the VIP offers video on demand type services, the subscriber could interact through a telephone call to the IP 37 to select a video and order delivery of the video to the subscriber's DET at a preselected time. After successful ordering of a particular event, the level 2 gateway would inform the IP of the prescheduled delivery. At the preselected time, the IP would instruct the subscriber's DET 217, to at least notify the user of the time for delivery of the ordered video. The user could then initiate a broadband interactive call to the VIP in the usual manner, and the VIP's server would transmit the selected program. If the DET 217 can be turned on and/or controlled automatically in response to signals from the IP 37, the IP 37 would instruct the DET 217 to turn on and initiate the broadband call to the VIP at the preselected time to automatically receive and display the ordered video. Alternatively, if the level 2 gateway can initiate broadband communications, at the preselected time, the level 2 gateway 401 would instruct the IP 37 to control the broadband communication network to establish a broadband session link to the subscriber's DET 217, and the level 2 gateway 401 would initiate a signaling call to that DET. Once the broadband link and signaling link are established, the level 2 gateway 401 would instruct the video on demand file server 403 to initiate transmission of the selected video.

The voice message prompting and digit collection functions of the IP can interface to the level 2 gateway to provide a variety of other services through voice grade telephone calls. For example, this interface to the level 2 gateway can be used for subscribing to services from the VIP and/or paying bills by debit or credit card. If the IP has speech recognition capabilities, the DTMF collection operations can be replaced and/or combined with speech recognition operations.

From the above description, it becomes abundantly clear that the IP offers a wide range of user interface options, for controlling broadband network functions, for selecting and modifying individual subscriber services of the network, for selecting and modifying individual subscriber services offered by different information providers, etc.

Although several preferred embodiments of the invention have been described in detail above, it should be clear that the present invention is capable of numerous modifications as would be apparent to one of ordinary skill in the art. Such modifications fall within the purview of the appended claims.

We claim:

1. A method of implementing transactions in an integrated communication system, which includes:

a plurality of telephone stations;

a plurality of separately located central office switching systems interconnected via trunk circuits for selectively providing switched telephone call communications between at least two of said telephone stations;

a service control point, separate from said central office switching systems, comprising a database storing call processing data associated with a plurality of said telephone stations for control of call processing through one or more of said central office switching systems;

a peripheral platform connected to at least one of said central office switching systems via a telephone call connection channel, said peripheral platform comprising means for providing at least one auxiliary telephone call processing capability via said telephone call connection channel including a database of personal speech identification templates pro-established by subscribing users;

a signaling communication system separate from said trunk circuits for two-way communications of data messages between said central office switching systems said central office switching systems and said service control point, and between said peripheral platform and said service control point;

a plurality of broadband information service provider systems, each service provider system being capable of transmitting broadband digital information;

a plurality of terminals for transmitting control signals upstream in response to user inputs and for providing displays in response to received digital information; and a broadband communication network selectively providing broadband digital communications from said service provider systems to said terminals; wherein said peripheral platform receives at least some of said control signals from said terminals, said method comprising the steps of:

(a) receiving from one of said terminals a control signal comprising instructions to initiate a transaction at said peripheral platform;

(b) in response to said control signal received pursuant to (a), retrieving from said template database one of said pre-established identification templates which is identified by said control signal;

(c) sending to said one of said terminals from which originated said control signal which identified said retrieved template a request for a user to speak an utterance associated with said template retrieved pursuant to (b);

(d) receiving at said peripheral platform a signal resulting from said user speaking said utterance;

(e) comparing said received signal resulting from said utterance with said retrieved template and responsive to establishing a match completing said transaction.

2. A method according to claim 1, wherein generation of said control signal by said one terminal includes the steps of:

(a) said user having viewed a display identifying a possible transaction, (b) initiating through said integrated communication system, a signal requesting the transaction identified.

3. A method according to claim 2, wherein said user initiates said request by establishing connection to said integrated communication system through one of said central office switching systems.

4. A method according to claim 3, wherein said connection is established by dialing a directory number which appeared in said display identifying said transaction.

5. A method according to claim 4, wherein said dialing is accomplished through remote wave communication with a remote terminal with which said dialing is accomplished.

6. A method according to claim 5, wherein said wave communication comprises sonic communication.

7. A method according to claim 5, wherein said wave communication comprises radio wave communication.

8. A method according to claim 5, wherein said wave communication comprises light wave communication.

9. A method according to claim 4, wherein said dialing of said directory number is accomplished through the use of a telephone station associated with said one terminal which terminal is connected to a central office in one of said central office switching systems through a twisted pair wire connection.

10. A method according to claim 1 wherein said signaling communication system used in said method includes:

a first signaling communication network for two-way communications of data messages, said first signaling communication network interconnecting said central office switching systems and connecting said central office switching systems to said service control point;

a second signaling communication network, separate from said first signaling communication network and said central office switching systems, for providing two-way communications of data messages between said peripheral platform and said service control point.

11. A method according to claim 10, wherein said peripheral platform used in said method includes:

a storage means enabling a user to store and retrieve messages via a voice connection to said one of said central office switching systems; and an internal data communication system connected to the second signaling network to permit communications with the service control point.

12. A method of implementing transactions in an integrated communication system which includes:

a plurality of telephone stations:

a plurality of separately located central office switching systems interconnected via trunk circuits for selectively providing switched telephone call communications between at least two of said telephone stations;

a service control point, separate from said central office switching systems, comprising a database storing call processing data associated with a plurality of said telephone stations for control of call processing through one or more of said central office switching systems;

a peripheral platform connected to at least one of said central office switching systems via a telephone call connection channel, said peripheral platform comprising means for providing at least one auxiliary telephone call processing capabilities via said telephone call connection channel and including a storage for data;

a signaling communication system separate from said trunk circuits for two-way communications of data messages between said central office switching systems, between said central office switching systems and said service control point, and between said peripheral platform and said service control point;

a plurality of broadband information service provider systems, each service provider system being capable of transmitting broadband digital information;

a plurality of terminals for transmitting control signals upstream in response to user inputs and for providing displays in response to received digital information; and a broadband communication network selectively providing broadband digital communications from said service provider systems to said terminals; wherein said peripheral platform receives at least some of said control signals from said terminals and controls at least some broadband operations of said integrated communication system in response to said control signals, said method comprising the steps of:
(a) inputting a voice signal of a subscriber at one of said telephone stations to create a voice template and storing said template at said data storage at said peripheral platform at a specific address;
(b) storing at said service control point data cross referencing said address with said inputting telephone station;
(c) receiving control signals representing instructions responsive to a user request from said telephone station to initiate a transaction at said peripheral platform;
(d) responsive to said received control signals retrieving said template from said data storage at such peripheral platform wherein said template is stored;
(e) sending to the user who originated said request a signal to speak the audio utterance associated with the retrieved template at the time that the template was created;
(f) receiving at said peripheral platform a signal resulting from said user who originated said request speaking said utterance;

(g) comparing said received signal with said template and responsive to establishing a match initiating said transaction.

13. A method according to claim 12, wherein generation of said control signals includes the steps of:
(a) said user who originated said request, having viewed a display identifying a possible transaction, (b) initiating through said integrated communication system, a signal requesting said transaction.

14. A method according to claim 12, wherein said user initiates said request by establishing connection to said integrated communication system through a central office switching system.

15. A method according to claim 14, wherein said connection is established by dialing a directory number identified in a display viewed by said user in connection with a transaction displayed by one of said terminals.

16. A method according to claim 15, wherein said dialing is accomplished through remote wave communication with a remote terminal.

17. A method according to claim 16, wherein said wave communication comprises audio communication.

18. A method according to claim 16, wherein said wave communication comprises radio wave communication.

19. A method according to claim 16, wherein said wave communication comprises light wave communication.

20. A method according to claim 15, wherein said dialing is accomplished by the user through a telephone station connected to a central office in one of said central office switching systems through a twisted pair wire connection.

* * * * *